United States Patent
Zhang et al.

(10) Patent No.: US 11,960,942 B2
(45) Date of Patent: Apr. 16, 2024

(54) SYSTEM AND METHOD FOR IDENTIFYING LOCK SEQUENCE CONFLICTS

(71) Applicant: EMC IP Holding Company, LLC, Hopkinton, MA (US)

(72) Inventors: Ming Zhang, Beijing (CN); Lei Gao, Beijing (CN); Wai Chuen Yim, Merrimack, NH (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 414 days.

(21) Appl. No.: 17/227,698

(22) Filed: Apr. 12, 2021

(65) Prior Publication Data

US 2022/0327008 A1    Oct. 13, 2022

(51) Int. Cl.
*G06F 16/23*    (2019.01)
*G06F 9/52*    (2006.01)

(52) U.S. Cl.
CPC .......... *G06F 9/524* (2013.01); *G06F 16/2343* (2019.01)

(58) Field of Classification Search
CPC .............................. G06F 9/524; G06F 16/2343
USPC .......................................................... 711/152
See application file for complete search history.

(56) References Cited

U.S. PATENT DOCUMENTS

| | | | |
|---|---|---|---|
| 10,838,783 B1* | 11/2020 | Roy | G06F 9/4881 |
| 2013/0339560 A1* | 12/2013 | Aoshima | G06F 9/52 710/200 |
| 2014/0250441 A1* | 9/2014 | Tonouchi | G06F 11/3604 718/106 |
| 2019/0034276 A1* | 1/2019 | Mark | G06F 3/064 |
| 2021/0286802 A1* | 9/2021 | Goren | H04L 67/1097 |
| 2022/0043796 A1* | 2/2022 | Li | G06F 16/2228 |

* cited by examiner

*Primary Examiner* — Christopher B Shin
(74) *Attorney, Agent, or Firm* — Brian J. Colandreo; Heath M. Sargeant; Holland & Knight LLP

(57) ABSTRACT

A method, computer program product, and computing system for receiving a plurality of lock sequences associated with a plurality of objects of the computing device. A plurality of matrices may be generated for each lock sequence of the plurality of lock sequences, thus defining a plurality of lock sequence matrix towers. The plurality of lock sequence matrix towers may be combined, thus defining a combined lock sequence matrix tower. One or more lock sequence conflicts may be identified within the plurality of lock sequences based upon, at least in part, the combined lock sequence matrix tower.

17 Claims, 20 Drawing Sheets

500

600

(12) United States Patent

SYSTEM AND METHOD FOR IDENTIFYING LOCK SEQUENCE CONFLICTS

BACKGROUND

Storing and safeguarding electronic content may be beneficial in modern business and elsewhere. Accordingly, various methodologies may be employed to protect and distribute such electronic content.

When a software module or program is executed at runtime, the software module or program will create an object (e.g., an application programming interface (API), a thread, a function, etc.) and utilize the object one or more times. The utilization of an object or many objects may include "locking" data or portions of data (e.g., files, storage volumes, virtual storage volumes, etc.) for a limited duration. This may allow an object to obtain exclusive use and access to a portion of data. However, as many objects attempt to utilize the same data or portions of data with various lock sequences, lock sequence conflicts may arise. Conventional lock sequence management processes are unable to address situations involving multiple lock sequences with overlapping locks leading to lock sequence conflicts.

SUMMARY OF DISCLOSURE

In one example implementation, a computer-implemented method executed on a computing device may include, but is not limited to, receiving a plurality of lock sequences associated with a plurality of objects of the computing device. A plurality of matrices may be generated for each lock sequence of the plurality of lock sequences, thus defining a plurality of lock sequence matrix towers. The plurality of lock sequence matrix towers may be combined, thus defining a combined lock sequence matrix tower. One or more lock sequence conflicts may be identified within the plurality of lock sequences based upon, at least in part, the combined lock sequence matrix tower.

One or more of the following example features may be included. Receiving the plurality of lock sequences may include processing a lock information binary file associated with processing the plurality of objects of the computing device at runtime. Generating the plurality of matrices for each lock sequence of the plurality of lock sequences may include generating a lock sequence matrix tower for each lock sequence for each object of the plurality of objects of the computing device. Generating the plurality of matrices for each lock sequence of the plurality of lock sequences may include generating a lock sequence matrix tower for each lock sequence based upon, at least in part, a level of one or more locks and one or more ancestor locks associated with the one or more locks. Combining the plurality of lock sequence matrix towers may include identifying a plurality of cross points in at least two lock sequence matrix towers of the plurality of lock sequence matrix towers. Combining the plurality of lock sequence matrix towers may include determining a sequence for the plurality of cross points in the at least two lock sequence matrix towers; and in response to determining that the sequences for the plurality of cross points in the at least two lock sequence matrix towers are different, moving one or more locks of the plurality of cross points to a different matrix level within the combined lock sequence matrix tower. Identifying the one or more lock sequence conflicts within the plurality of lock sequences for the plurality of objects may include identifying a sequence for the plurality of cross points in the at least two lock sequence matrix towers that cannot be combined.

In another example implementation, a computer program product resides on a computer readable medium that has a plurality of instructions stored on it. When executed by a processor, the instructions cause the processor to perform operations that may include, but are not limited to, receiving a plurality of lock sequences associated with a plurality of objects of the computing device. A plurality of matrices may be generated for each lock sequence of the plurality of lock sequences, thus defining a plurality of lock sequence matrix towers. The plurality of lock sequence matrix towers may be combined, thus defining a combined lock sequence matrix tower. One or more lock sequence conflicts may be identified within the plurality of lock sequences based upon, at least in part, the combined lock sequence matrix tower.

One or more of the following example features may be included. Receiving the plurality of lock sequences may include processing a lock information binary file associated with processing the plurality of objects of the computing device at runtime. Generating the plurality of matrices for each lock sequence of the plurality of lock sequences may include generating a lock sequence matrix tower for each lock sequence for each object of the plurality of objects of the computing device. Generating the plurality of matrices for each lock sequence of the plurality of lock sequences may include generating a lock sequence matrix tower for each lock sequence based upon, at least in part, a level of one or more locks and one or more ancestor locks associated with the one or more locks. Combining the plurality of lock sequence matrix towers may include identifying a plurality of cross points in at least two lock sequence matrix towers of the plurality of lock sequence matrix towers. Combining the plurality of lock sequence matrix towers may include determining a sequence for the plurality of cross points in the at least two lock sequence matrix towers; and in response to determining that the sequences for the plurality of cross points in the at least two lock sequence matrix towers are different, moving one or more locks of the plurality of cross points to a different matrix level within the combined lock sequence matrix tower. Identifying the one or more lock sequence conflicts within the plurality of lock sequences for the plurality of objects may include identifying a sequence for the plurality of cross points in the at least two lock sequence matrix towers that cannot be combined.

In another example implementation, a computing system includes at least one processor and at least one memory architecture coupled with the at least one processor, wherein the at least one processor is configured to receive a plurality of lock sequences associated with a plurality of objects of the computing device. The at least one processor may be further configured to generate a plurality of matrices for each lock sequence of the plurality of lock sequences, thus defining a plurality of lock sequence matrix towers. The at least one processor may be further configured to combine the plurality of lock sequence matrix towers, thus defining a combined lock sequence matrix tower. The at least one processor may be further configured to identify one or more lock sequence conflicts within the plurality of lock sequences based upon, at least in part, the combined lock sequence matrix tower.

One or more of the following example features may be included. Receiving the plurality of lock sequences may include processing a lock information binary file associated with processing the plurality of objects of the computing device at runtime. Generating the plurality of matrices for each lock sequence of the plurality of lock sequences may include generating a lock sequence matrix tower for each lock sequence for each object of the plurality of objects of the computing device. Generating the plurality of matrices for each lock sequence of the plurality of lock sequences may include generating a lock sequence matrix tower for each lock sequence based upon, at least in part, a level of one or more locks and one or more ancestor locks associated with the one or more locks. Combining the plurality of lock sequence matrix towers may include identifying a plurality of cross points in at least two lock sequence matrix towers of the plurality of lock sequence matrix towers. Combining the plurality of lock sequence matrix towers may include determining a sequence for the plurality of cross points in the at least two lock sequence matrix towers; and in response to determining that the sequences for the plurality of cross points in the at least two lock sequence matrix towers are different, moving one or more locks of the plurality of cross points to a different matrix level within the combined lock sequence matrix tower. Identifying the one or more lock sequence conflicts within the plurality of lock sequences for the plurality of objects may include identifying a sequence for the plurality of cross points in the at least two lock sequence matrix towers that cannot be combined.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
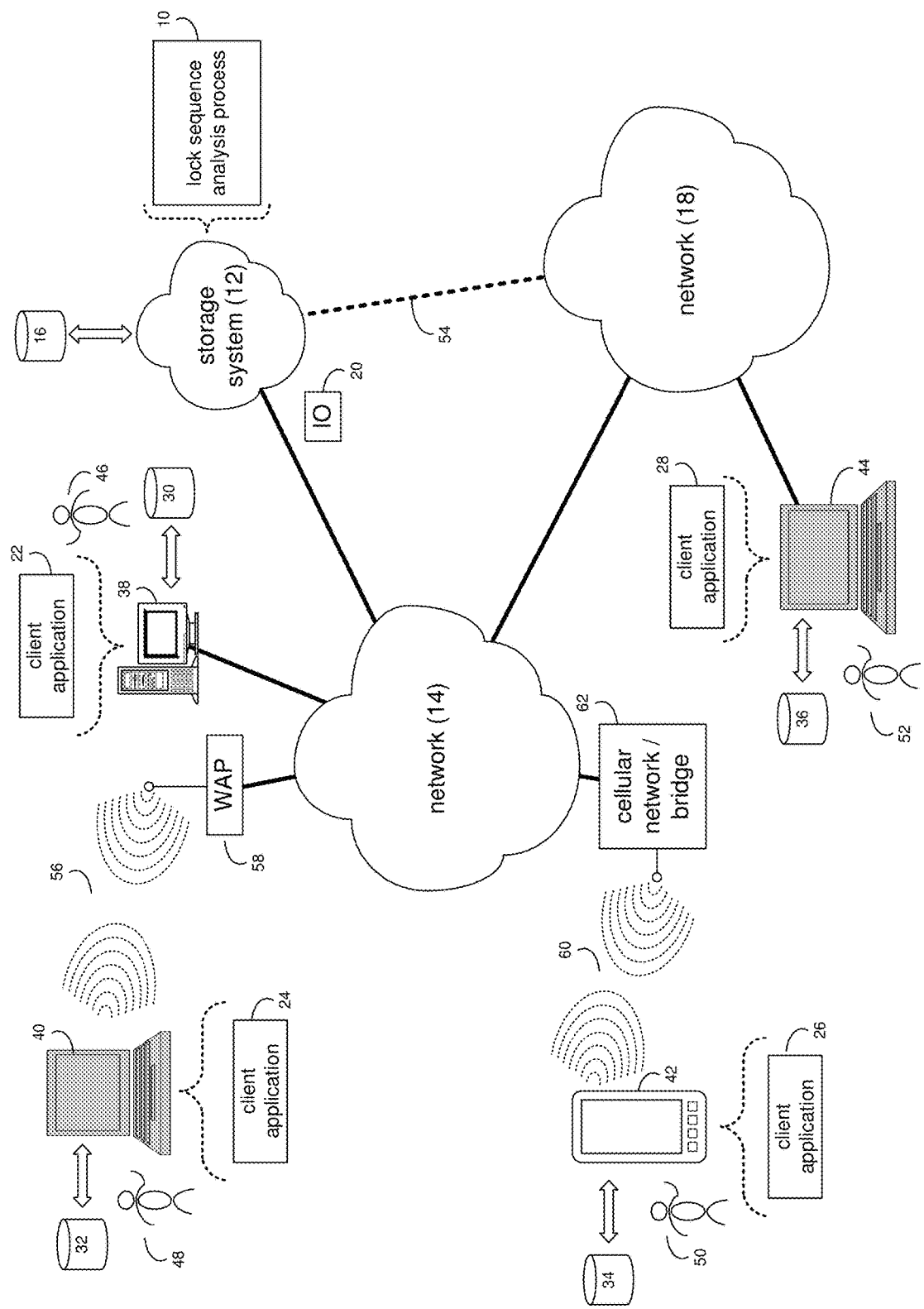
FIG. 1 is an example diagrammatic view of a storage system and a lock sequence analysis process coupled to a distributed computing network according to one or more example implementations of the disclosure.

System Overview:

Referring to FIG. 1, there is shown lock sequence analysis process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of lock sequence analysis process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of lock sequence analysis process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a lock sequence analysis process, such as lock sequence analysis process 10 of FIG. 1, may include but is not limited to, receiving a plurality of lock sequences associated with a plurality of objects of the computing device. A plurality of matrices may be generated for each lock sequence of the plurality of lock sequences, thus defining a plurality of lock sequence matrix towers. The plurality of lock sequence matrix towers may be combined, thus defining a combined lock sequence matrix tower. One or more lock sequence conflicts may be identified within the plurality of lock sequences based upon, at least in part, the combined lock sequence matrix tower.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
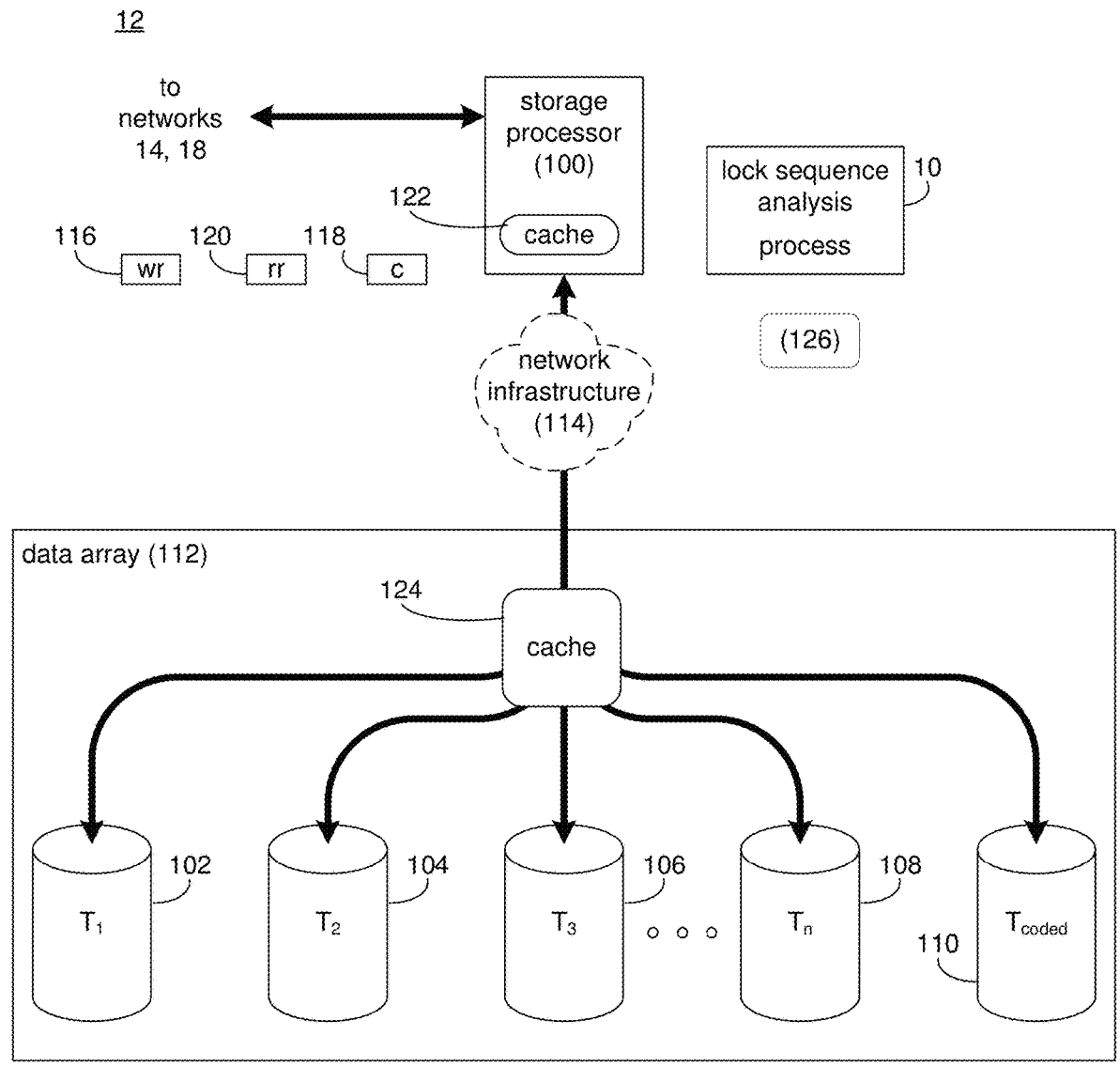
FIG. 2 is an example diagrammatic view of the storage system of FIG. 1 according to one or more example implementations of the disclosure.
Figure 3:
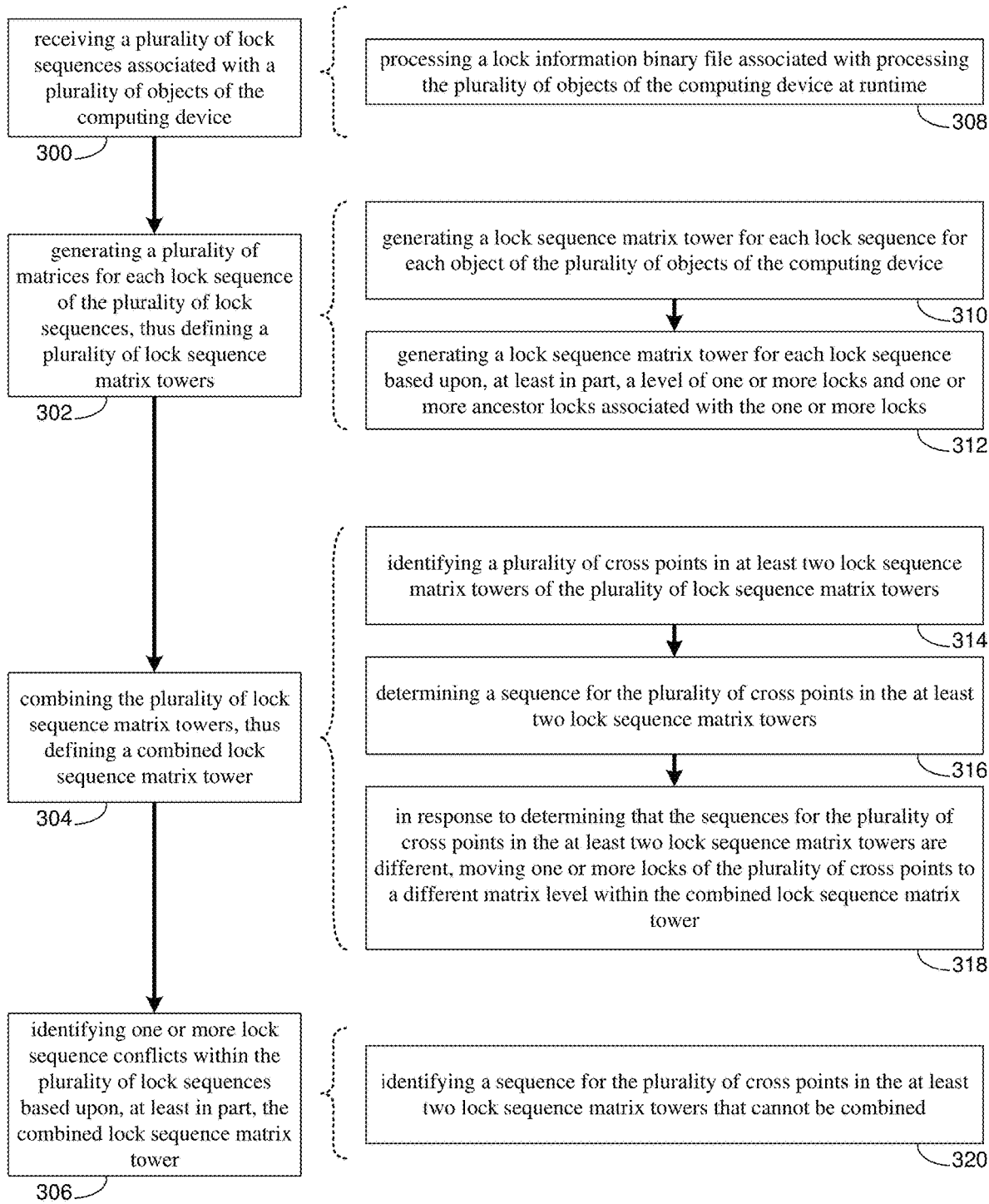
FIG. 3 is an example flowchart of lock sequence analysis process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of lock sequence analysis process 10. The instruction sets and subroutines of lock sequence analysis process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of lock sequence analysis process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of lock sequence analysis process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of lock sequence analysis process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Lock Sequence Analysis Process:

Referring also to the examples of FIGS. 3-20 and in some implementations, lock sequence analysis process 10 may receive 300 a plurality of lock sequences associated with a plurality of objects of the computing device. A plurality of matrices may be generated 302 for each lock sequence of the plurality of lock sequences, thus defining a plurality of lock sequence matrix towers. The plurality of lock sequence matrix towers may be combined 304, thus defining a combined lock sequence matrix tower. One or more lock sequence conflicts may be identified 306 within the plurality of lock sequences based upon, at least in part, the combined lock sequence matrix tower.

As will be discussed in greater detail below, implementations of the present disclosure may allow for conflicts between lock sequences for various objects to be identified more efficiently than possible by conventional lock management techniques. For example, when a software module or program is executed (e.g., at runtime), the module or program will create an object (e.g., an application programming interface (API), a thread, a function, etc.) and utilize the object one or more times. The utilization of an object or many objects may include "locking" data or portions of data (e.g., files, storage volumes, virtual storage volumes, etc.) for a limited duration. This may allow an object to obtain exclusive use and access to a portion of data.

Figure 4:
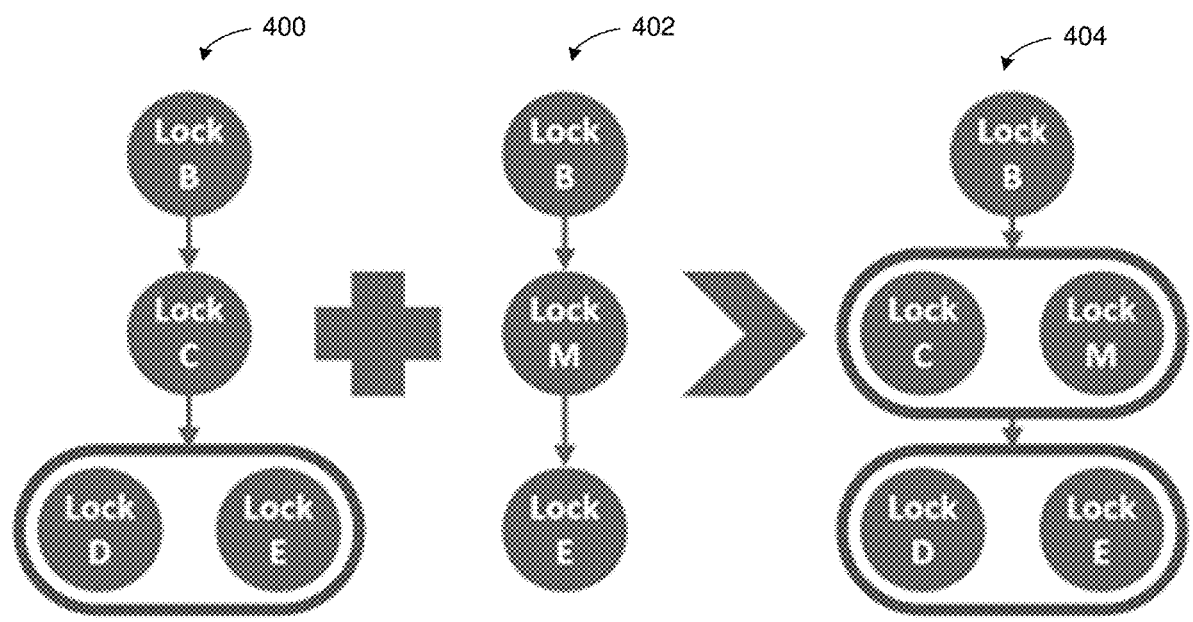
FIG. 4 is an example diagrammatic view of a plurality of lock sequences for a plurality of objects according to one or more example implementations of the disclosure.

Referring also to FIG. 4 and in some implementations, suppose an object (e.g., an API, a thread, a function, etc.) uses various portions of data (e.g., files, storage volumes, virtual storage volumes, etc.). In the example of FIG. 4, suppose an object (e.g., object "X") uses e.g., four portions of data). In this example, object X obtains multiple locks (e.g., lock B, lock C, lock D, and lock E). In this example, the term "lock B" may represent a symbolic lock address. In some implementations, the lock address may include a static lock address and a runtime lock address. In some implementations, multiple runtime lock addresses may map to the same static lock address. Further suppose that object X has the following lock sequence (e.g., lock sequence 400): lock B, lock C, lock D, unlock D, lock E, unlock E, unlock C, unlock B. In this example, lock sequence 400 of object X is: [B, C, [D, E]]. Now suppose that another object (e.g., object "Y") obtains multiple locks (e.g., lock B, lock M, lock E) with the following lock sequence (e.g., lock sequence 402): lock B, lock M, lock E, unlock E, unlock M, unlock B. In this example, data or portions of data represented as "B" and "E" may be accessed by both object X and object Y. As such, lock sequence conflicts may or may not arise between lock sequences 400 and 402 based on their execution.

Returning to the example of FIG. 4, conventional lock sequence management processes may attempt to combine lock sequence 400 and lock sequence 402 into a combined lock sequence (e.g., lock sequence 404). However, as shown in FIG. 4, combined lock sequence 404 is not be accurate because lock M does not have any relationship with lock D, so it would not necessarily lock before lock D. As such, conventional lock sequence management processes are unable to address situations involving multiple lock sequences with overlapping locks.

As will be discussed in greater detail below, implementations of the present disclosure may allow for the generation of lock sequence matrix towers that may be combined by lock sequence analysis process 10 in a computationally efficient manner (e.g., combining entire matrices as opposed to conventional approaches where locks may be added to a lock sequence and remapped with each new lock). In this manner, the ability for lock sequence conflicts between many objects to be identified may be improved and the efficiency by which a computing device (e.g., with lock sequence analysis process 10) is able to identify these lock sequence conflicts may be enhanced by generating lock sequence matrix towers and by combining the lock sequence matrix towers as described herein.

In some implementations, lock sequence analysis process 10 may receive 300 a plurality of lock sequences associated with a plurality of objects of the computing device. As discussed above, when a software module or program is executed at runtime, the module or program will create an object (e.g., an application programming interface (API), a thread, a function, etc.) and utilize the object one or more times. In some implementations, receiving 300 the plurality of lock sequences may include processing 308 a lock information binary file associated with processing the plurality of objects of the computing device at runtime. For example, when a program is executed, a plurality of objects may be created. In some implementations, lock sequence analysis process 10 may generate a lock information binary file (e.g., lock information binary file 126 as shown in FIG. 1) that includes information for each lock operation associated with a particular object or a plurality of objects. Accordingly, a lock sequence may be received 400 by processing 308 the lock information binary file.

In some implementations, lock sequence analysis process 10 may generate 302 a plurality of matrices for each lock sequence of the plurality of lock sequences, thus defining a plurality of lock sequence matrix towers. As discussed above and in some implementations, conventional approaches for managing lock sequences between objects may be limited to simply combining lock sequences or addressing each lock sequence separately. As such, these conventional approaches may be unable to identify lock sequence conflicts because of inaccurate combinations and/or may be computationally demanding by processing and re-processing lock sequences individually. Accordingly, lock sequence analysis process 10 may generate 302 a plurality of matrices for each lock sequence. As will be discussed in greater detail below, these lock sequence matrices may be combined into lock sequence matrix towers to allow for a more computationally-efficient process for identifying lock sequence conflicts than is available with conventional lock sequence management processes.

Figure 5:
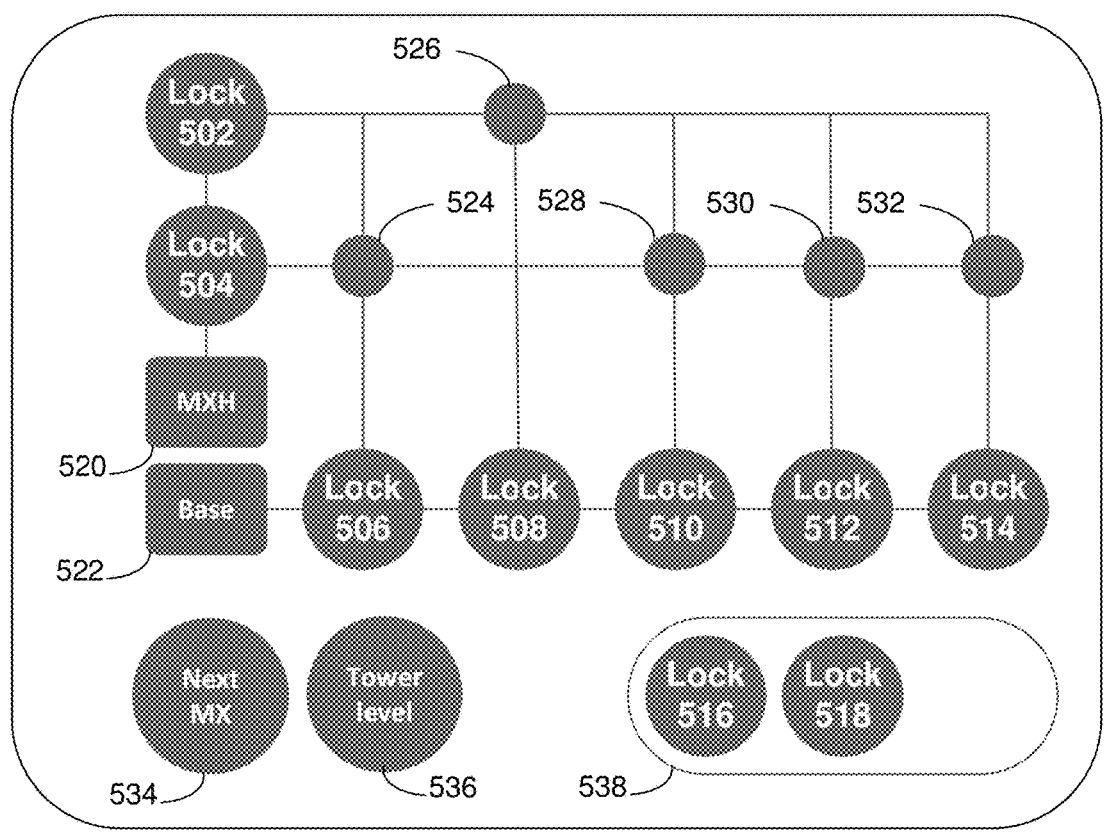
FIG. 5 is an example lock sequence matrix generated according to one or more example implementations of the disclosure.

Referring also to FIG. 5 and in some implementations, lock sequence analysis process 10 may generate 302 a matrix (e.g., matrix 500) representative of at least a portion of a lock sequence. In this example, suppose that an object (e.g., object "Z") involves accessing various data or portions of data with various lock and unlock operations (e.g., lock 502, lock 504, lock 506, lock 508, lock 510, lock 512, lock 514, lock 516, and lock 518). In this example, lock sequence analysis process 10 may generate matrix 500 with one or more rows associated with a matrix index (e.g., matrix index 520) and one or more columns associated with a lock record (e.g., lock record 522). As will be discussed in greater detail below, matrix 500 may be generated 302 to include one or more connection points (e.g., connection points 524, 526, 528, 530, 532) to indicate a sequence or relationship between particular locks.

Figure 6:
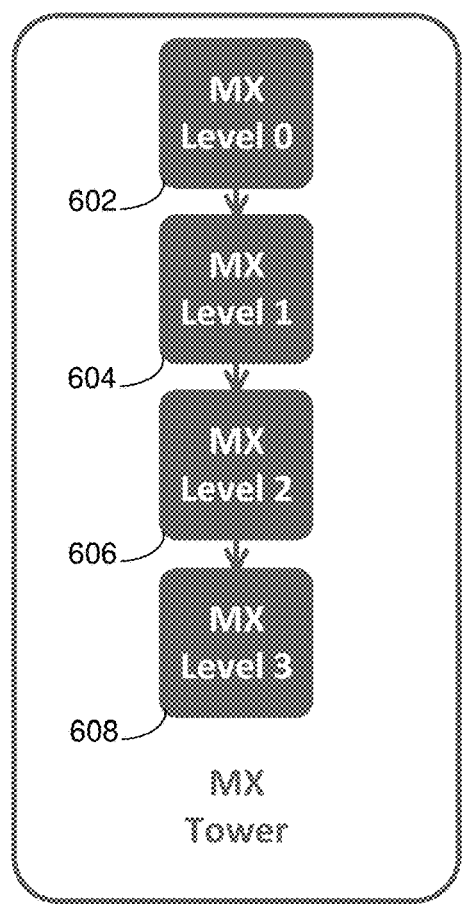
FIG. 6 is an example diagrammatic view of a lock sequence matrix tower according to one or more example implementations of the disclosure.

Lock sequence analysis process 10 may generate 302 matrix 500 with a reference to the next matrix (e.g., next matrix reference 534) and an indication of a matrix tower level (e.g., matrix tower level 536). For example, next matrix reference 534 may include a pointer to the next matrix level. Referring also to FIG. 6 and in some implementations, lock sequence analysis process 10 may generate 302 a "tower" structure (e.g., lock sequence matrix tower 600) with multiple levels of matrices "stacked" on top of each other (e.g., matrix level 0 602, matrix level 1 604, matrix level 2 606, and matrix level 3 608). In some implementations, matrix tower level 536 may indicate the tower level of a particular matrix in the matrix tower structure. While lock sequence matrix tower 600 is shown with e.g., four matrix levels, it will be appreciated that a lock sequence matrix tower may include any number of matrix levels within the scope of the present disclosure.

In some implementations, lock sequence analysis process 10 may generate 302 matrix 500 with one or more lock pass-through references (e.g., pass-through references 538). As will be discussed in greater detail below, a lock pass-through reference may generally include a reference to a lock that passes through a matrix (e.g., from one matrix level to another matrix level). In other words, the one or more lock pass-through references may indicate one or more locks of the lock sequence from a lower or previous matrix level, through the current matrix level, to a higher or subsequent matrix level. For example, suppose a matrix at level 0 includes a lock that references a lock in a matrix at level 2. In this example, the matrix at level 1 may include the lock as a lock pass-through reference in the matrix at level 1. While an example of a single lock being included as a lock pass-through reference has been described above, it will be appreciated that any number of locks may be included as lock pass-through references within the scope of the present disclosure.

Figure 7:
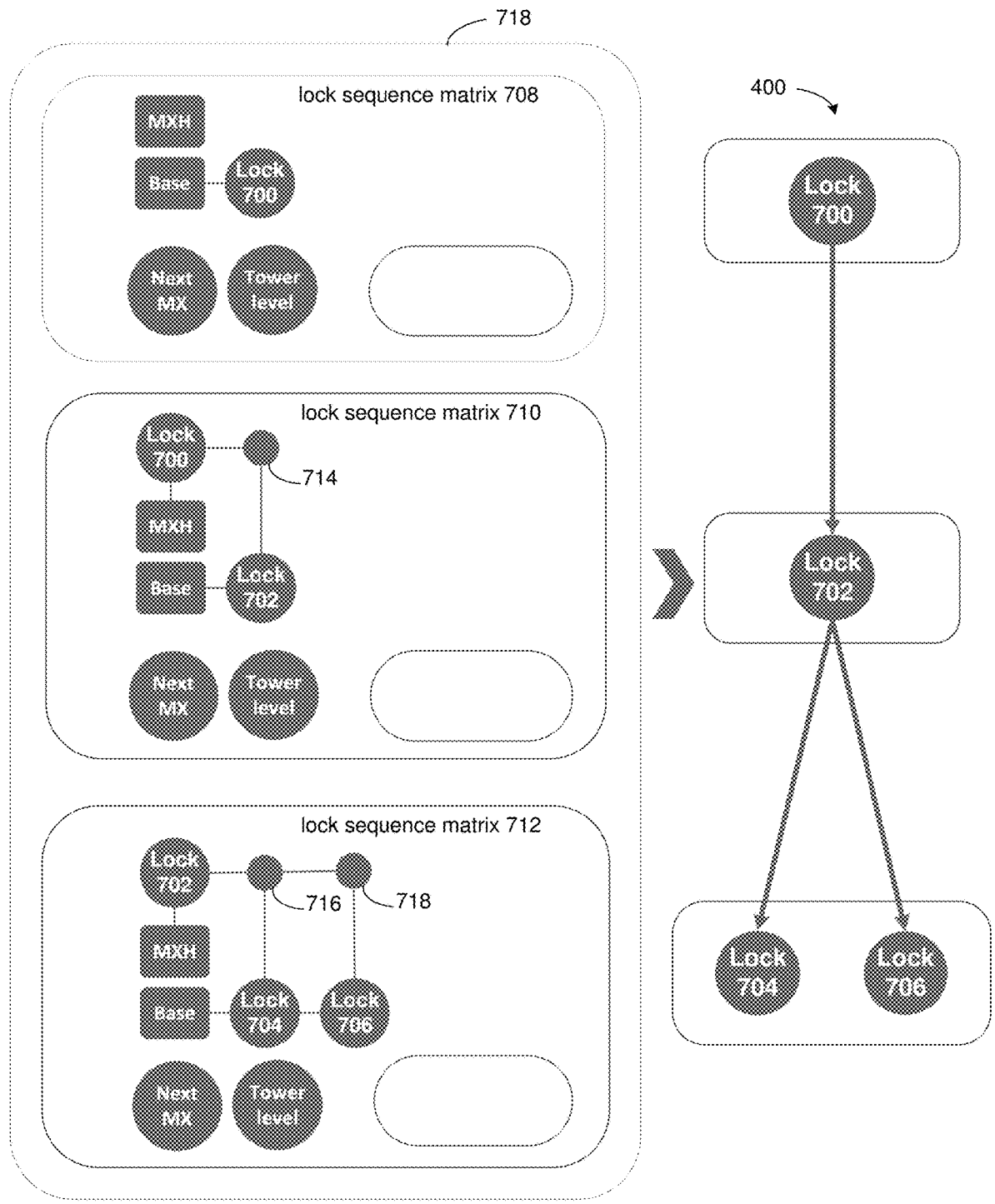
FIGS. 7-8 are example diagrammatic views of lock sequence matrix towers generated for various lock sequences according to one or more example implementations of the disclosure.
Figure 8:
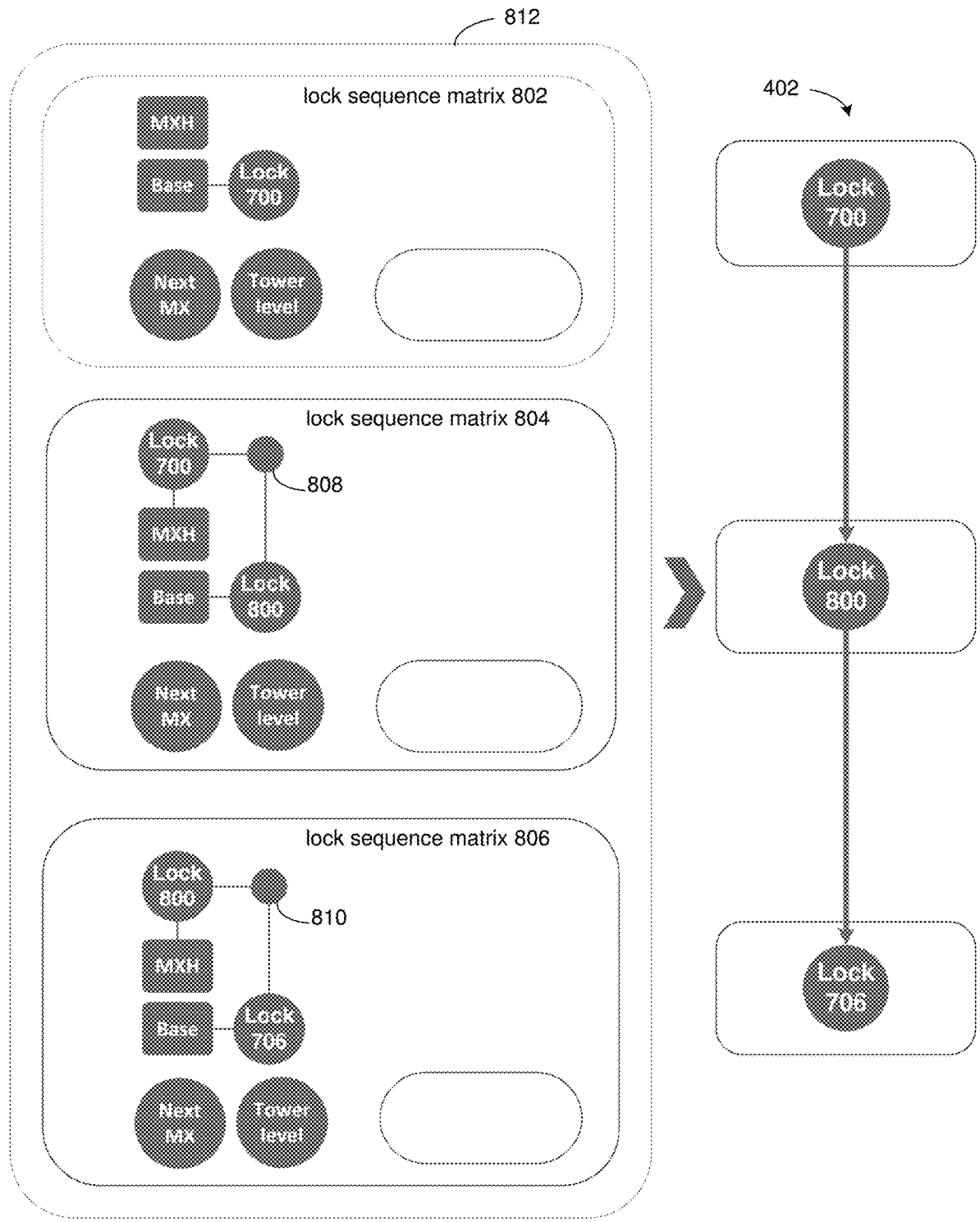

In some implementations, generating 302 the plurality of matrices for each lock sequence of the plurality of lock sequences may include generating 310 a lock sequence matrix tower for each lock sequence for each object of the plurality of objects of the computing device. Referring also to FIGS. 7-8 and in some implementations, lock sequence analysis process 10 may generate 302 a lock sequence matrix for each lock sequence (e.g., lock sequence 400 of object X and lock sequence 402 of object Y). As discussed above, suppose that lock sequence 400 includes the following sequence: lock 700, lock 702, lock 704, unlock 704, lock 706, unlock 706, unlock 702, unlock 700. Further suppose that lock sequence 402 includes the following sequence: lock 700, lock 800, lock 706, unlock 706, unlock 800, unlock 700. In the above example, the term "lock 700" may indicate a lock operation on a particular address associated with a portion of data. Similarly, the term "unlock 700" may indicate an unlock operation on a particular address associated with a portion of data.

In some implementations, generating 302 the plurality of matrices for each lock sequence of the plurality of lock sequences may include generating 312 a lock sequence matrix tower for each lock sequence based upon, at least in part, a level of one or more locks and one or more ancestor locks associated with the one or more locks. For example and referring again to FIG. 7, lock sequence analysis process 10 may generate 302 lock sequence matrix 708 for a first level of locks (e.g., lock 700) of lock sequence 400. Lock sequence analysis process 10 may generate 302 lock sequence matrix 710 for a second level of locks (e.g., lock 702) and lock sequence matrix 712 for a third level of locks (e.g., locks 704, 706). In some implementations, lock sequence matrix 710 may define the relationship between each lock of the second level (e.g., lock 702) and the ancestor locks for the locks of the second level (e.g., lock 700). For example, lock sequence matrix 710 may include a connection point (e.g., connection point 714) indicating a relationship between lock 700 and lock 702. Lock sequence matrix 712 may define the relationship between each lock of the third level (e.g., locks 704, 706) and the ancestor locks for the locks of the third level (e.g., lock 702). For example, lock sequence matrix 712 may include two connection points (e.g., connection points 716, 718) indicating a relationship between lock 702 and lock 704 and a relationship between lock 702 and lock 706. In some implementations, the combination of lock sequence matrices 708, 710, and 712 may define lock sequence matrix tower 718 for lock sequence 400.

Continuing with the above example and referring also to FIG. 8, lock sequence analysis process 10 may generate 302 lock sequence matrix 802 for a first level of locks (e.g., lock 700) of lock sequence 402. Lock sequence analysis process 10 may generate 302 lock sequence matrix 804 for a second level of locks (e.g., lock 800) and lock sequence matrix 806 for a third level of locks (e.g., lock 706). In some implementations, lock sequence matrix 804 may define the relationship between each lock of the second level (e.g., lock 800) and the ancestor locks for the locks of the second level (e.g., lock 700). For example, lock sequence matrix 804 may include a connection point (e.g., connection point 808) indicating a relationship between lock 700 and lock 800.

In some implementations, lock sequence matrix 806 may define the relationship between each lock of the third level (e.g., lock 706) and the ancestor locks for the locks of the third level (e.g., lock 800). For example, lock sequence matrix may include a connection point (e.g., connection point 810) indicating a relationship between lock 800 and lock 706. In some implementations, the combination of lock sequence matrices 802, 804, and 806 may define lock sequence matrix tower 812 for lock sequence 402. While the above example includes three matrix levels and two lock sequences, it will be appreciated that lock sequence analysis process 10 may generate 302 any number of lock sequence matrices for any number of lock sequences with any number of matrix levels and/or ancestor locks, within the scope of the present disclosure.

Figure 9:
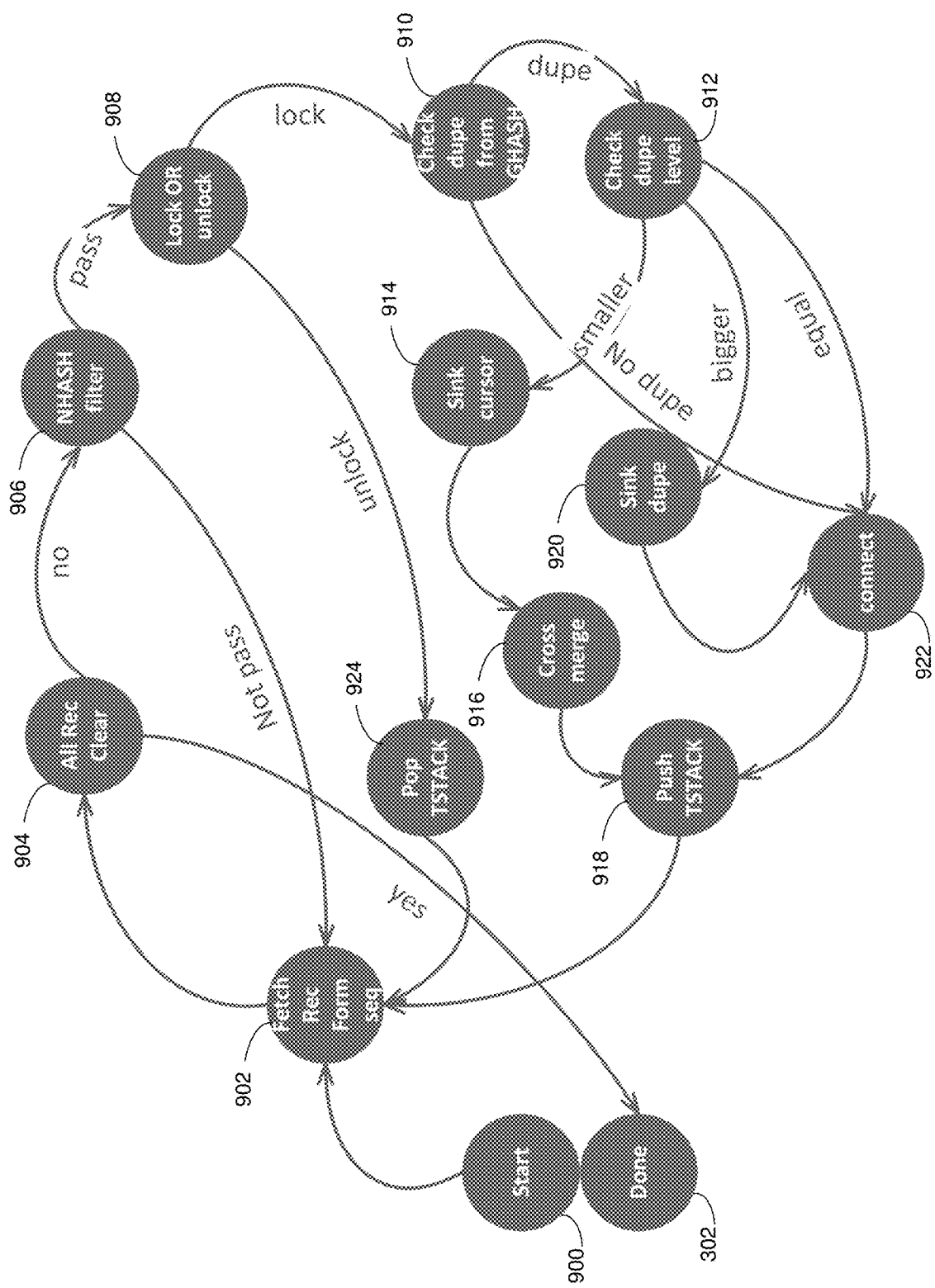
FIG. 9 is an example state diagram of lock sequence analysis process according to one or more example implementations of the disclosure.

Referring also to FIG. 9 and in some implementations, lock sequence analysis process 10 may generate 302 a plurality of matrices for each lock sequence of the plurality of lock sequences, thus defining a plurality of lock sequence matrix towers. As shown in the state diagram of FIG. 9 and in some implementations, lock sequence analysis process 10 may generate 302 the plurality of lock sequence matrix towers for each lock sequence with a plurality of actions or states. For example and as discussed above, lock sequence analysis process 10 may start 900 by fetching or processing 902 a lock information binary file to determine a lock sequence. Specifically, lock sequence analysis process 10 may process 902 each lock record separately. In some implementations, lock sequence analysis process 10 may determine 904 whether all lock records have been processed. If not, lock sequence analysis process 10 may perform 906 a nested hash operation (e.g., shown as "NHASH" in FIG. 9) to filter lock records with the same static lock address (e.g., "Lock B") but distinct runtime lock addresses. If the lock record passes the nested hash operation, lock sequence analysis process 10 may determine 908 whether the lock record is for locking or unlocking a portion of data. If the lock record is for locking the portion of data, lock sequence analysis process 10 may determine 910 whether any duplicates of the lock record exist in a lock sequence matrix tower by performing a global hash operation (e.g., shown as "GHASH" in FIG. 9).

In some implementations and as will be discussed in greater detail below, performing the global hash function may be used to identify one or more cross points across lock sequence matrix towers. For each cross point identified, lock sequence analysis process 10 may add the cross point to the hash with the lock address and a lock sequence matrix tower number or other identifier. In this manner, lock sequence analysis process 10 may identify one or more cross points across at least two lock sequence matrix towers.

In some implementations, lock sequence analysis process 10 may determine 910 that a duplicate lock record exists in a lock sequence and may determine 912 which matrix level the duplicate is on. If the duplicate lock record is on a lower or smaller level, lock sequence analysis process 10 may "sink" 914 the lock record being added to the lock sequence matrix tower down to the same matrix tower level and may cross merge 916 the lock record with the duplicate lock record. After cross merging 916 the lock record and the duplicate lock record, lock sequence analysis process 10 may add 918 or "push" the lock record to a stack or data structure of lock records within the lock sequence matrix tower. In some implementations, the stack may indicate which the ancestor lock for the current lock.

In some implementations, if the duplicate lock record is on an upper or higher level, lock sequence analysis process 10 may "sink" 920 the duplicate lock record down to the same matrix tower level as the lock record being added to the lock sequence matrix tower and may connect 922 the duplicate lock record to the other lock records in the sequence. If the duplicate lock record is on the same matrix tower level, lock sequence analysis process 10 may connect 922 the duplicate lock record to the other lock records in the sequence and may add 918 the lock record to the stack or data structure of lock records within the lock sequence matrix tower. In some implementations, lock sequence analysis process 10 may repeat the above process until all lock records have been processed and/or until each lock address of the stack or data structure has been "popped" 924 in response to determining an unlock operation for a particular lock address. At that point, lock sequence analysis process 10 may finish 926. While the example state diagram of FIG. 9 displays one order of actions or states for generating 302 a plurality of matrices for each lock sequence of the plurality of lock sequences, it will be appreciated that the conditions for transferring between actions or states of FIG. 9 are for example purposes only and may include other conditions. Similarly, it will be appreciated that the sequence of states is for example purposes only as additional states may be added and/or states may be bypassed within the scope of the present disclosure.

In some implementations, lock sequence analysis process 10 may combine 304 the plurality of lock sequence matrix towers, thus defining a combined lock sequence matrix tower. Referring again to FIGS. 7-8 and in some implementations, lock sequence analysis process 10 may combine 304 lock sequence matrix towers 718 and 812 for lock sequences 400 and 402. As will be described in greater detail below, lock sequence analysis process 10 may identify 314 one or more lock sequence conflicts by combining lock sequence matrix towers for multiple lock sequences. In some implementations, lock sequence analysis process 10 may utilize the levels of each lock sequence matrix tower and/or a plurality of cross points to combine 304 multiple lock sequence matrix towers.

Figure 10:
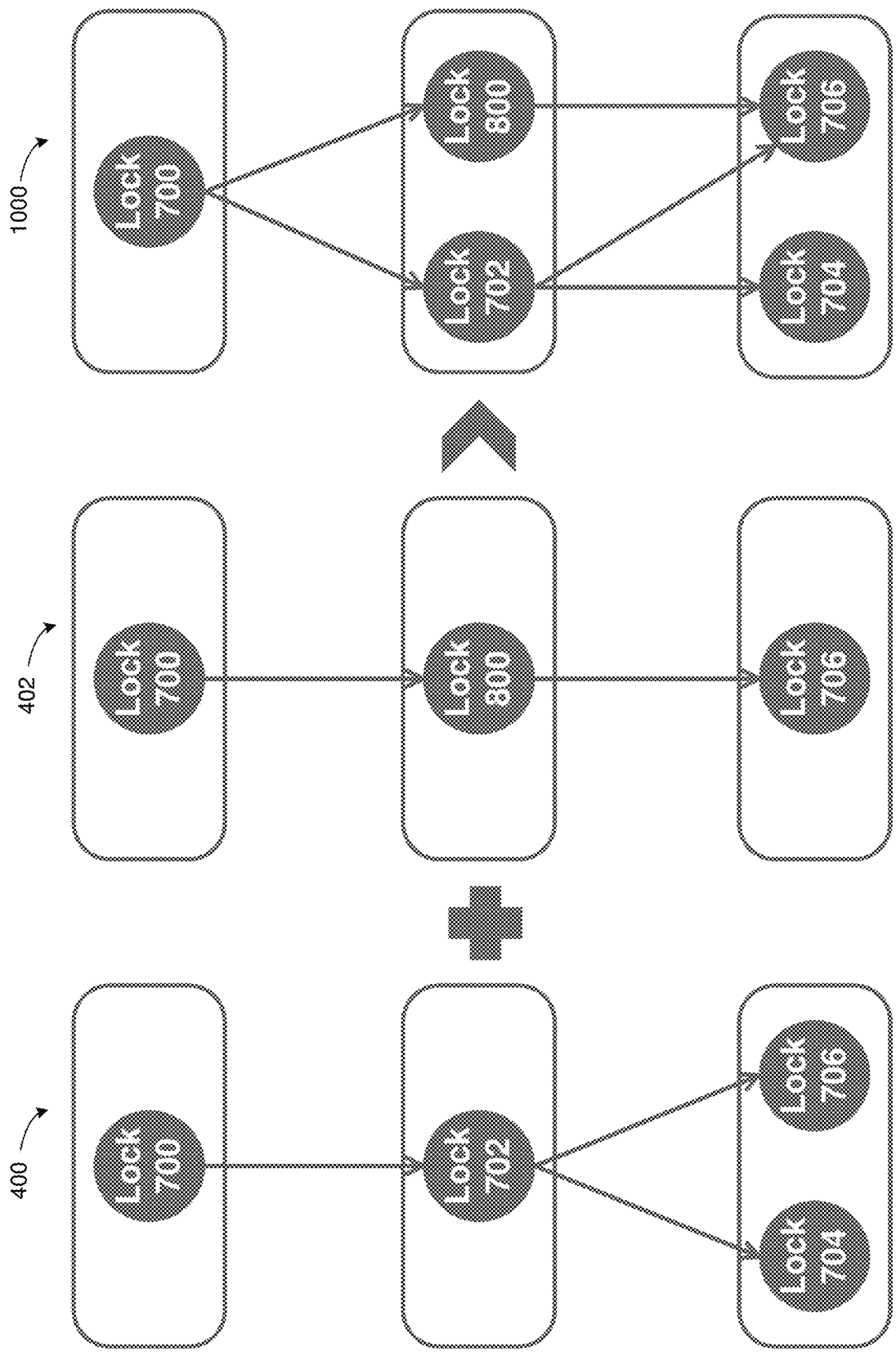
FIG. 10 is an example diagrammatic view of a combination of lock sequences for a plurality of objects according to one or more example implementations of the disclosure.
Figure 11:
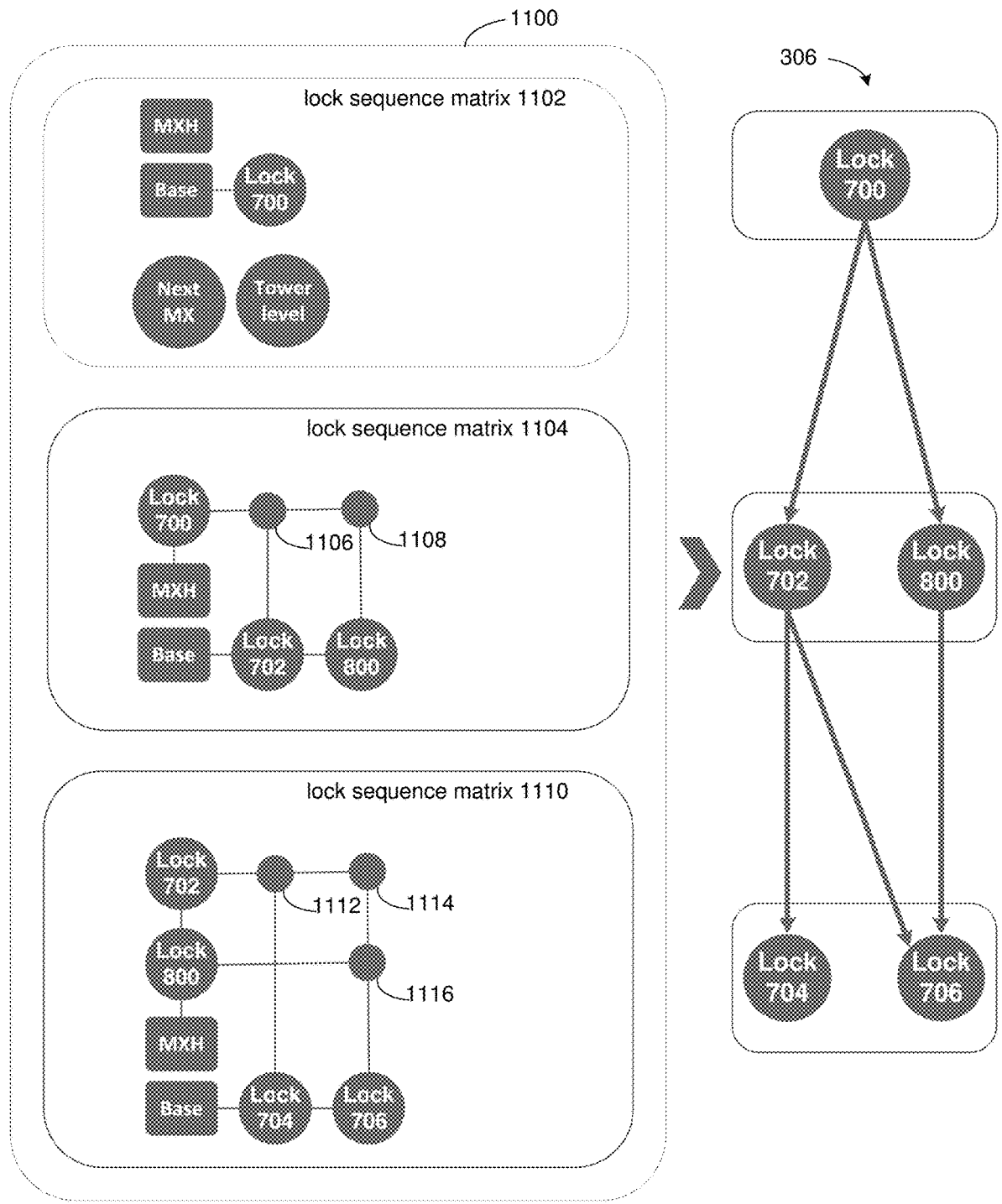
FIG. 11 is an example combined lock sequence matrix tower generated according to one or more example implementations of the disclosure.

In some implementations, combining 304 the plurality of lock sequence matrices may include identifying 314 a plurality of cross points in at least two lock sequence matrix towers of the plurality of lock sequence matrix towers. Referring again to the above example and as shown in FIGS. 7-8, lock sequence analysis process 10 may identify 314 a plurality of cross points in at least two lock sequence matrix towers (e.g., lock sequence matrix towers 718, 812). A cross point may generally include the same lock(s) in multiple lock sequence matrix towers. As shown in the example of FIG. 10, lock sequence analysis process 10 may identify 714 lock 700 and lock 706 as cross points for lock sequence matrix towers 718, 812 because lock 700 and lock 706 are included in both lock sequences.

In some implementations, lock sequence analysis process 10 may combine 304 the lock sequence matrix towers of two lock sequences at a time. As discussed above, a combination of lock sequence matrices for an individual lock sequence may generally be referred to as a lock sequence matrix tower. Accordingly, lock sequence analysis process 10 may combine 304 two lock sequence matrix towers at a time. In other words, when combining 304 more than two lock sequences, lock sequence analysis process 10 may generate the lock sequence matrix towers for a first lock sequence and a second lock sequence and may then combine 304 a first lock sequence matrix tower and a second lock sequence matrix tower, thus defining a combined lock sequence matrix tower. Lock sequence analysis process 10 may then generate a lock sequence matrix tower for a third lock sequence and may combine 304 a third lock sequence matrix tower with the combined lock sequence matrix until all lock sequence matrix towers have been combined 304 or until it is determined that a particular lock sequence matrix tower cannot be combined with the combined lock sequence matrix tower (e.g., identifying 306 a lock sequence conflict).

In some implementations, combining 304 the plurality of lock sequence matrices may include determining 316 a sequence for the plurality of cross points in the at least two lock sequence matrix towers. For example and referring also to FIG. 11, lock sequence analysis process 10 may combine 304 lock sequence matrix tower 718 and lock sequence matrix tower 812 to generate combined lock sequence matrix tower 1100. In this example, lock sequence analysis process 10 may identify 314 locks 700 and 706 as cross points between lock sequences 400 and 402. Lock sequence analysis process 10 may determine 316 whether or not the one or more cross points are in the same sequence. For example, lock 700 of lock sequence matrix 708 and lock sequence matrix 802 are at the same matrix level and in the same sequence. Similarly, lock sequence analysis process 10 may determine 316 that lock 706 of lock sequence matrix 712 and lock sequence matrix 806 are at the same matrix level and in the same sequence. Accordingly, lock sequence analysis process 10 may combine 304 lock sequence matrices 708 and 802 to generate combined lock sequence matrix 1102; lock sequence matrices 710 and 804 to generate combined lock sequence matrix 1104 with connection points 1106, 1108; and lock sequence matrices 712 and 806 to generate combined lock sequence matrix 1110 with connection points 1112, 1114, 1116.

Figure 12:
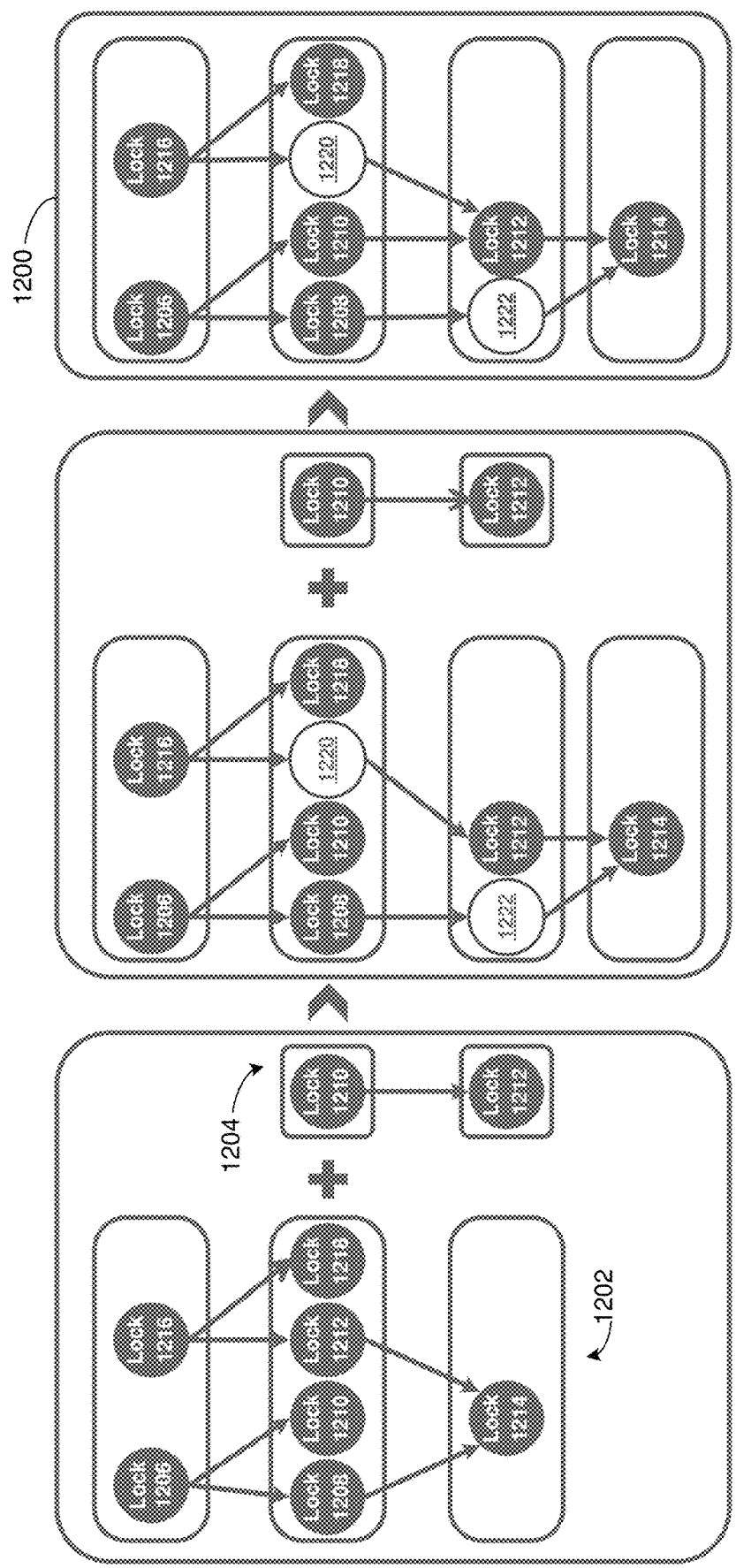
FIGS. 12-14 are example diagrammatic views of combinations of lock sequences for a plurality of objects according to one or more example implementations of the disclosure.

Referring also to FIG. 12 and in some implementations, combining 304 the plurality of lock sequence matrices may include determining 316 a sequence for the plurality of cross points in the at least two lock sequence matrix towers. In this example, lock sequence analysis process 10 may combine 304 lock sequence matrix towers for lock sequence 1202 and lock sequence 1204 to generate combined lock sequence matrix tower 1200. In this example, lock sequence analysis process 10 may identify 314 locks 1210 and 1212 as cross points between lock sequences 1202 and 1204. Lock sequence analysis process 10 may determine 316 whether or not the one or more cross points are in the same sequence. For example, in lock sequence 1202, locks 1210 and 1212 are at the same matrix level while in lock sequence 1204, lock 1210 is in a different matrix level from lock 1212. As such and as will be discussed in greater detail below, lock sequence analysis process 10 may determine 316 that locks 1210 and 1212 are not in the same sequence.

Figure 13:
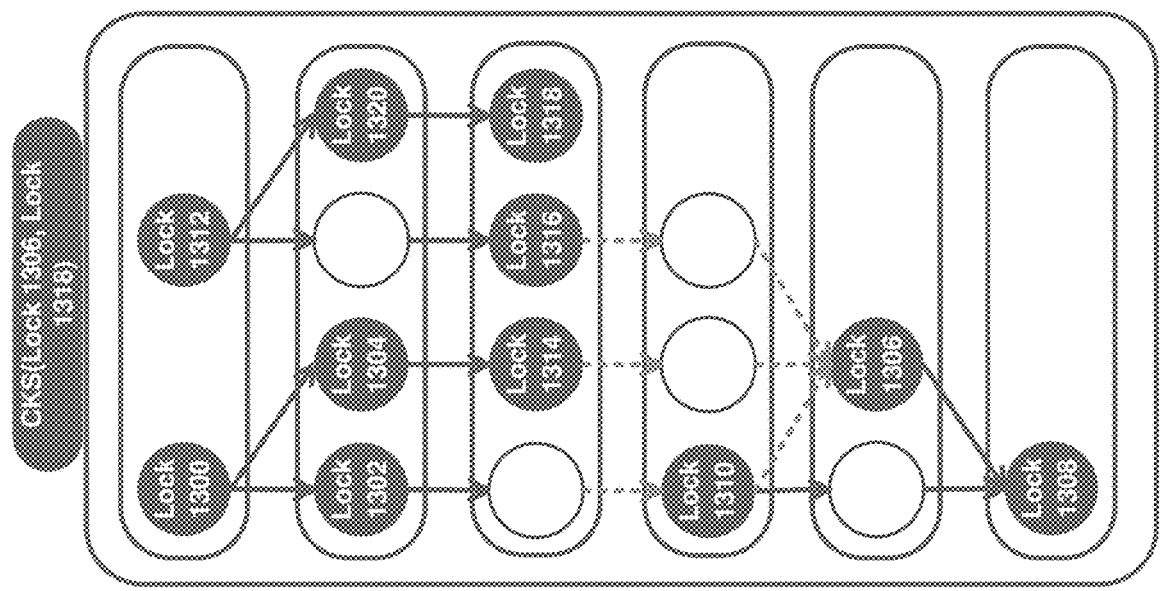
Figure 13:
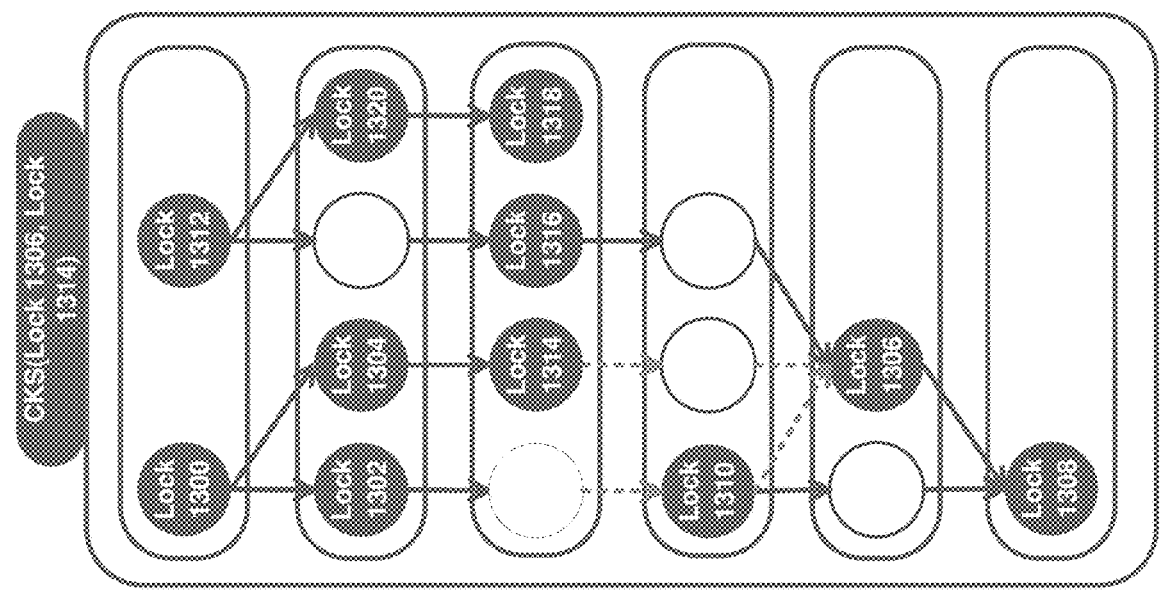
Figure 14:
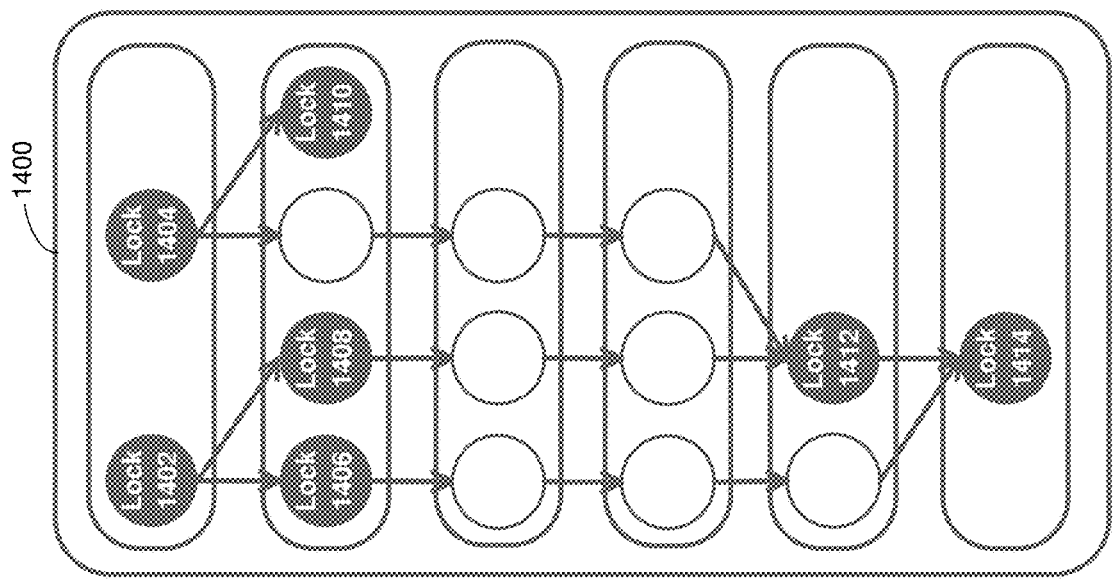
Figure 14:
Figure 14:
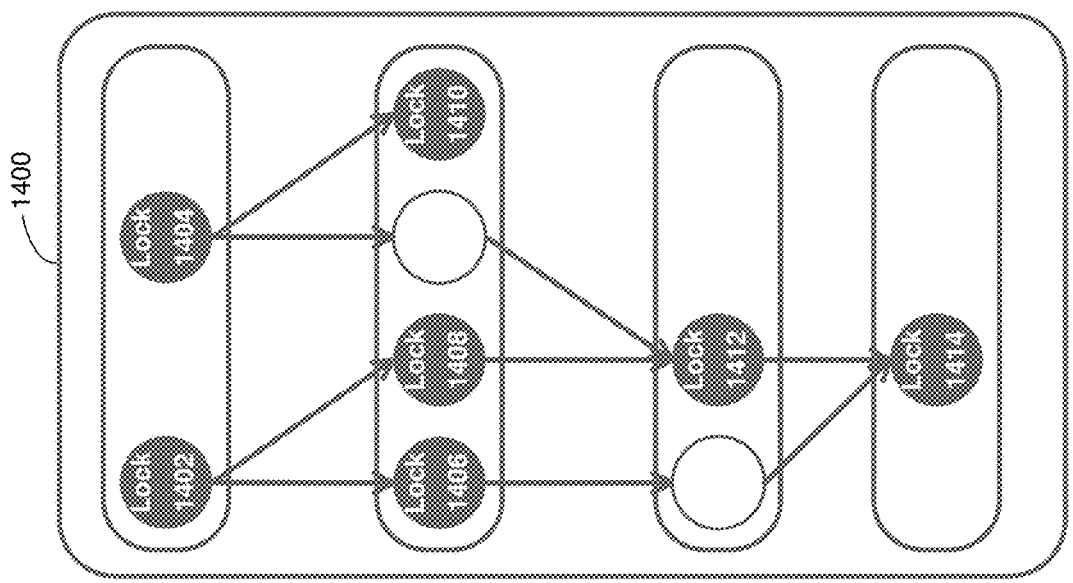

Referring also to FIG. 13 and in some implementations, lock sequence analysis process 10 may determine 316 a sequence for the plurality of cross points in the at least two lock sequence matrix towers by determining whether or not the cross points are in the same sequence. For example, lock sequence analysis process 10 may utilize the lock address and the lock sequence matrix tower level of each cross point to perform a computationally-efficient traversal of only a portion of a lock sequence matrix tower.

For example and as shown in the left portion of FIG. 13, suppose lock sequence analysis process 10 receives a request to determine whether lock 1306 and lock 1316 are in the same sequence. Lock sequence analysis process 10 may determine the level of each lock within the lock sequence matrix. In this example and as shown by the dashed arrows between lock 1306 and the matrix level of lock 1316, lock sequence analysis process 10 may check each path between lock 1306 and the matrix level of lock 1316 by checking each of the paths from lock 1306 on the fifth matrix level to the third matrix level. By limiting the scope of traversal to the levels of the lock sequence matrix tower of lock 1306 and lock 1316, lock sequence analysis process 10 may check just four paths from lock 1306 before determining that lock 1316 is in a sequence with lock 1306. In this manner, lock sequence analysis process 10 may perform a small traversal between a source lock and destination lock's tower level without requiring a full mapping of a lock sequence matrix tower. In this manner, lock sequence analysis process 10 may improve a computing device's ability to combine lock sequences and identify lock sequence conflicts.

As shown in the right portion of FIG. 13, suppose lock sequence analysis process 10 receives a request to determine whether lock 1306 and lock 1318 are in the same sequence. Lock sequence analysis process 10 may determine the level of each lock within the lock sequence matrix. In this example and as shown by the dashed arrows between lock 1306 and the level of the lock sequence matrix tower with lock 1318, lock sequence analysis process 10 may check each path between lock 1306 and the level of the lock sequence matrix tower with lock 1318 by checking each of the paths from lock 1306 on the fifth matrix level to the third matrix level. Lock sequence analysis process 10 may check just six paths from lock 1306 before determining that lock 1318 is not in a sequence with lock 1306.

In some implementations, combining 304 the plurality of lock sequence matrices may include, in response to determining that the sequences for the plurality of cross points in the at least two lock sequence matrix towers are different, moving 318 one or more locks of the plurality of cross points to a different matrix level within the combined lock sequence matrix tower. Referring again to the example of FIG. 12 and continuing with the above example, lock sequence analysis process 10 may determine 316 that locks 1210 and 1212 are not in the same order in both lock sequences. In some implementations, moving 318 one or more locks of the plurality of cross points may include sinking one or more locks to a different level of the combined lock sequence matrix tower. Sinking one or more locks may generally include moving one or more locks to a higher level. In some implementations, sinking one or more locks may reshape a combined lock sequence matrix tower without changing the relationship between locks.

For example, lock sequence analysis process 10 may sink lock 1212 from a second matrix level to a third matrix level. As shown in FIG. 12, sinking lock 1212 from the second matrix level to the third matrix level may include sinking lock 1214 from the third matrix level to the fourth matrix level to preserve the relationship of locks 1212 and 1214. In this example, lock sequence analysis process 10 may connect lock 1210 to lock 1212 as in lock sequence 1204. While the example of FIG. 12 includes sinking lock 1212, it will be appreciated that lock sequence analysis process 10 may sink any number of locks from either lock sequence.

Continuing with the above example, lock sequence analysis process 10 may generate or add one or more lock pass-through references when moving one or more locks to a different level of the combined lock sequence matrix tower. For example and as discussed above, a lock pass-through reference may generally include a reference to a lock that passes through a matrix (e.g., from one matrix level to another matrix level). In some implementations, a lock pass-through reference may also be referred to as a "wormhole". Referring again to the example of FIG. 12 and in some implementations, lock sequence analysis process 10 may add a lock pass-through reference (e.g., lock pass-through reference 1220) or wormhole for lock 1216 such that the relationship between lock 1216 and lock 1212 passes through the second matrix level of the combined lock sequence matrix tower.

Additionally, lock sequence analysis process 10 may add a lock pass-through reference (e.g., lock pass-through reference 1222) or wormhole for lock 1208 such that the relationship between lock 1208 and lock 1214 passes through the third matrix level of the combined lock sequence matrix tower. In some implementations, a lock pass-through reference may be represented in the lock sequences of the present disclosure as an empty circle. While an example of e.g., two lock pass-through references has been described, it will be appreciated that any number of lock pass-through references may be generated within the scope of the present disclosure.

As shown in the example of FIG. 12 and in some implementations, lock sequence analysis process 10 may connect lock 1210 and lock 1212 in response to sinking lock 1212 to the third matrix level. In this manner, combined lock sequence matrix tower 1200 may represent the efficient adjustment of the position of locks in each lock sequence matrix tower and subsequent combination of the adjusted lock sequence matrix towers.

In some implementations, moving 318 one or more locks of the plurality of cross points may include adding one or more levels in a lock sequence matrix tower. In some implementations, adding the one or more levels or "expanding" the lock sequence matrix tower may generally include providing new, empty levels to allow a desired sequence between two cross points to be achieved. For example and referring also to FIG. 14, lock sequence analysis process 10 may expand lock sequence matrix 1400 by adding e.g., two levels between lock 1406 and lock 1412. While an example of adding e.g., two levels has been described, it will be appreciated that any number of levels may be added to a lock sequence matrix tower within the scope of the present disclosure.

In some implementations, lock sequence analysis process 10 may identify 306 one or more lock sequence conflicts within the plurality of lock sequences based upon, at least in part, the combined lock sequence matrix tower. As shown in the state diagram depiction of FIG. 15 and in some implementations, lock sequence analysis process 10 may identify 306 one or more lock sequence conflicts when combining at least two lock sequence matrix towers. Lock sequence analysis process 10 may start 1500 by processing 1502 a "next tower" (e.g., a lock sequence matrix tower to be combined with another lock sequence matrix tower). As discussed above, as two lock sequence matrix towers may be combined to define the combined lock sequence matrix tower, the combined lock sequence matrix tower may also be referred to as a "global" lock sequence matrix tower and the lock sequence matrix tower to be combined with the combined lock sequence matrix tower, may be referred to as a "next" lock sequence matrix tower.

In some implementations, processing 1502 the next lock sequence matrix tower may include identifying 314 a plurality of cross points in at least two lock sequence matrix towers of the plurality of lock sequence matrix towers. Lock sequence analysis process 10 may identify 1504 or "find" an upper cross point (e.g., a first cross point). If no cross points are identified, the next lock sequence matrix tower may be combined 1506 with the global lock sequence matrix tower and the process may finish 1508. If at least one cross point is identifier, lock sequence analysis process 10 may identify 1510 or "find" a lower cross point (e.g., a second cross point). If a second cross point cannot be identified, lock sequence analysis process 10 may adjust 1512 the tower levels and combine 1506 the next lock sequence matrix tower and the global lock sequence matrix tower. If a second cross point can be identified, the combination of the first and second cross point may define a cross point pair.

In some implementations, when a cross point pair is identified in both the next lock sequence matrix tower and the global lock sequence matrix tower, lock sequence analysis process 10 may determine 1514 whether the order of the cross point pair in each of the next lock sequence matrix tower and the global lock sequence matrix tower are different. If lock sequence analysis process 10 determines 1514 that the order of the cross point pair in each of the next lock sequence matrix tower and the global lock sequence matrix tower are the same (i.e., not different), lock sequence analysis process 10 may "reset the cursor" 1516 to the next cross point.

If lock sequence analysis process 10 determines 1514 that the order of the cross point pair in each of the next lock sequence matrix tower and the global lock sequence matrix tower are different, lock sequence analysis process 10 may check 1518 the sequence of the cross point pair in the next lock sequence matrix tower to determine whether the cross point pair is in the same sequence. As discussed above and as shown in FIG. 13, lock sequence analysis process 10 may check 1518 the sequence of two cross points based on the lower cross point and the matrix tower level of the upper cross point. If the pair of cross points are not in the same sequence, lock sequence analysis process 10 may sink 1520 the uppermost cross point of the cross point pair (e.g., the cross point closest to or within the first matrix level in the lock sequence matrix tower) and find 1522 a "clean zone". A clean zone may generally include a lock in the sequence of locks that does not change in position within the lock sequence matrix tower following a sink operation. As such, finding the clean zone may identify an unaffected lock for resetting the cursor.

If the pair of cross points within the next lock sequence matrix tower are in the same sequence, lock sequence analysis process 10 may check 1524 the sequence of the cross point pair in the global lock sequence matrix tower to determine whether the cross point pair is in the same sequence. If the pair of cross points are not in the same sequence, lock sequence analysis process 10 may sink 1526 the uppermost cross point of the cross point pair (e.g., the cross point closest to or within the first matrix level in the lock sequence matrix tower) and find 1528 a "clean zone".

Lock sequence analysis process 10 may then "reset the cursor" 1516 to the next cross point and continue processing until all cross points have been combined in the combined lock sequence matrix tower or until a lock sequence conflict is identified. For example and referring again to FIG. 15, if the pair of cross points within the global lock sequence matrix tower are in the same sequence, lock sequence analysis process 10 may determine 1530 that the global lock sequence matrix tower and the next lock sequence matrix tower may not be combined. Accordingly, lock sequence analysis process 10 may identify 306 a lock sequence conflict between the cross point pair.

Figure 15:
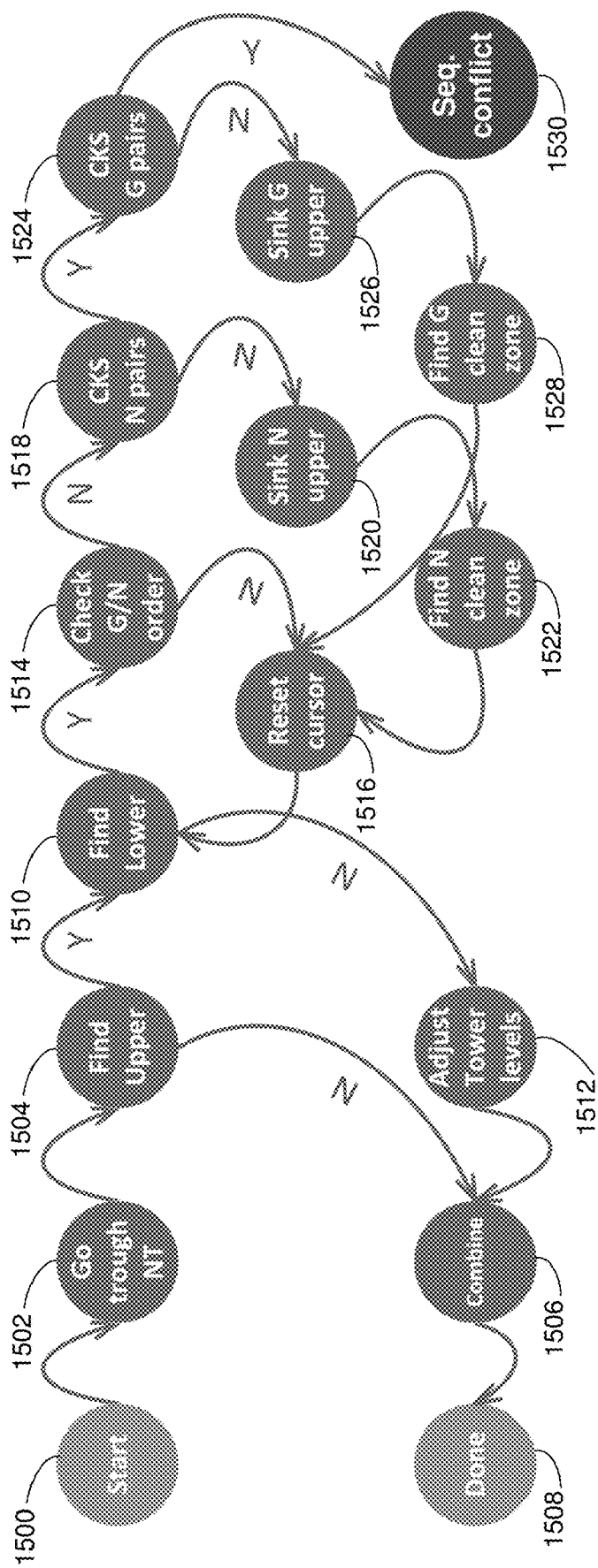
FIG. 15 is an example state diagram of lock sequence analysis process according to one or more example implementations of the disclosure.
Figure 16:
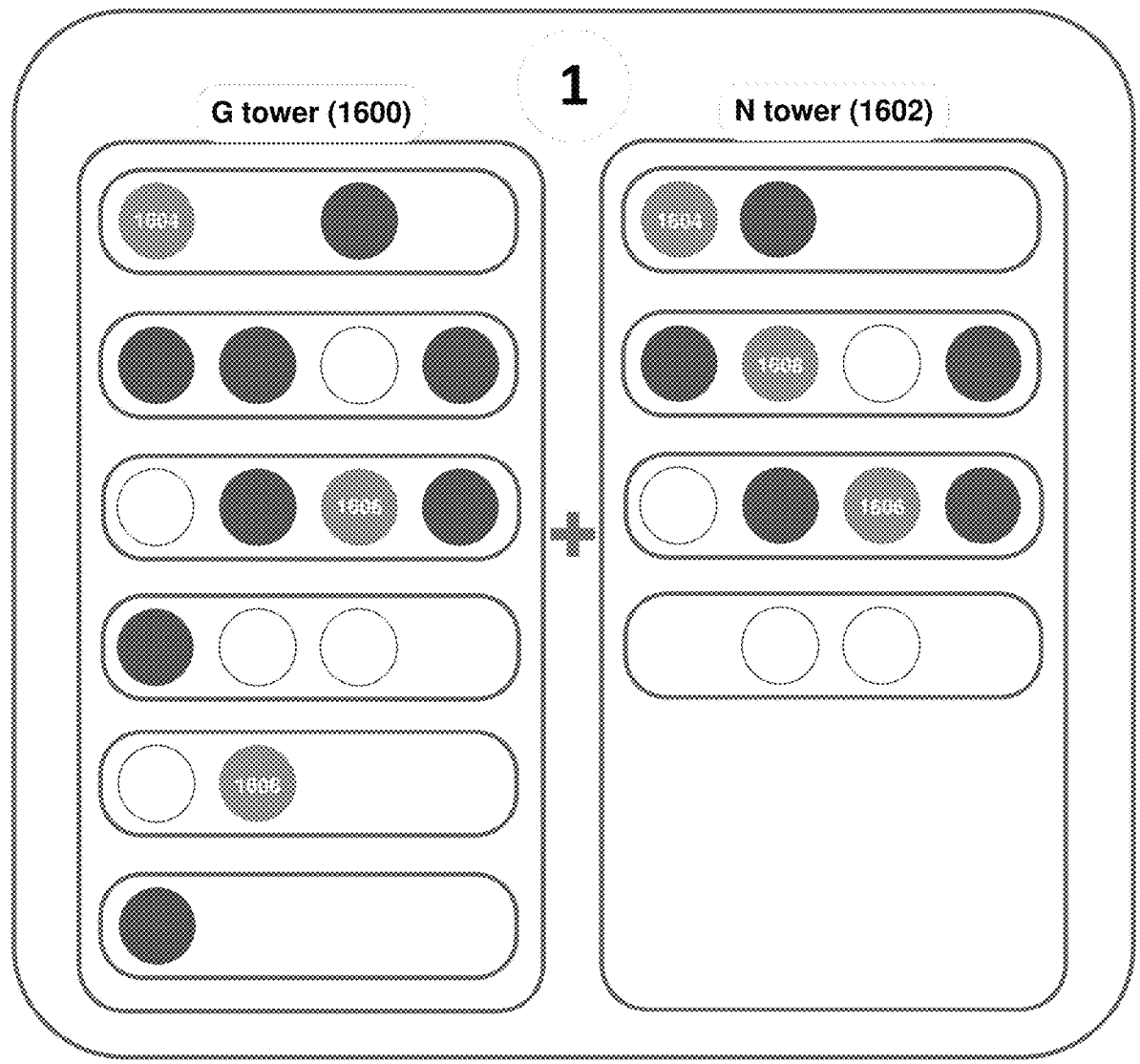
FIGS. 16-19 are example diagrammatic views of combinations of lock sequences for a plurality of objects when combining a plurality of lock sequence matrix towers according to one or more example implementations of the disclosure.

Referring also to FIGS. 16-19 and as an example of the process describe in FIG. 15, suppose lock sequence analysis process 10 generates 302 a plurality of matrices for each lock sequence of the plurality of lock sequences. In this example, suppose that lock sequence matrix tower 1600 is the global lock sequence tower matrix (e.g., shown as "G tower 1600" in FIGS. 16-19) and that lock sequence matrix tower 1602 is the next lock sequence tower matrix (e.g., shown as "N tower 1602" in FIGS. 16-19). Referring to FIG. 16, suppose lock sequence analysis process 10 attempts to combine 304 the plurality of lock sequence matrix towers, thus defining a combined lock sequence matrix tower. In this example, lock sequence analysis process 10 may identify 314 a plurality of cross points in the lock sequence matrix towers (e.g., global lock sequence matrix tower 1600 and next lock sequence matrix tower 1602). In this example, lock sequence analysis process 10 may identify 314 cross points 1604, 1606, 1608.

Figure 17:
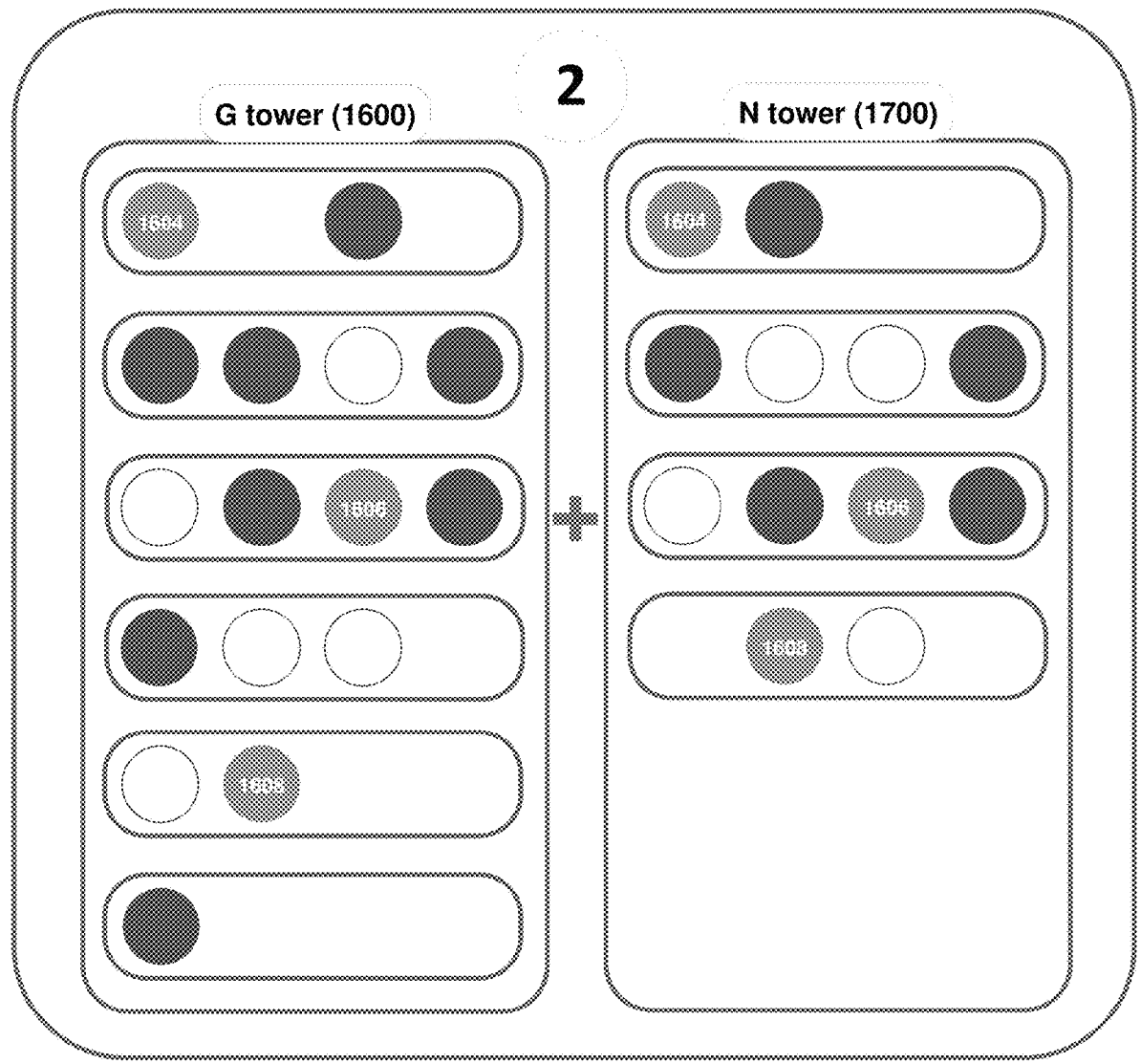

Referring again to FIG. 15 and continuing with the above example, lock sequence analysis process 10 may identify cross point 1604 as the "upper" cross point and cross point 1606 as the "lower" cross point of a cross point pair. In this example, lock sequence analysis process 10 may determine that cross point 1604 and cross point 1606 are in the same order in both global lock sequence matrix tower 1600 and next lock sequence matrix tower 1602. Accordingly, lock sequence analysis process 10 may reset the cursor to the next cross point and define cross point 1606 as the "upper" cross point and cross point 1608 as the "lower" cross point of the cross point pair. In this example, lock sequence analysis process 10 may determine that cross point 1606 and cross point 1608 are in different orders in global lock sequence matrix tower 1600 and next lock sequence matrix tower 1602. Accordingly and as shown in FIG. 17, lock sequence analysis process 10 may sink cross point 1608 such that cross points 1606 and 1608 are in the same order in global lock sequence matrix tower 1600 and next lock sequence matrix tower 1700.

Figure 18:
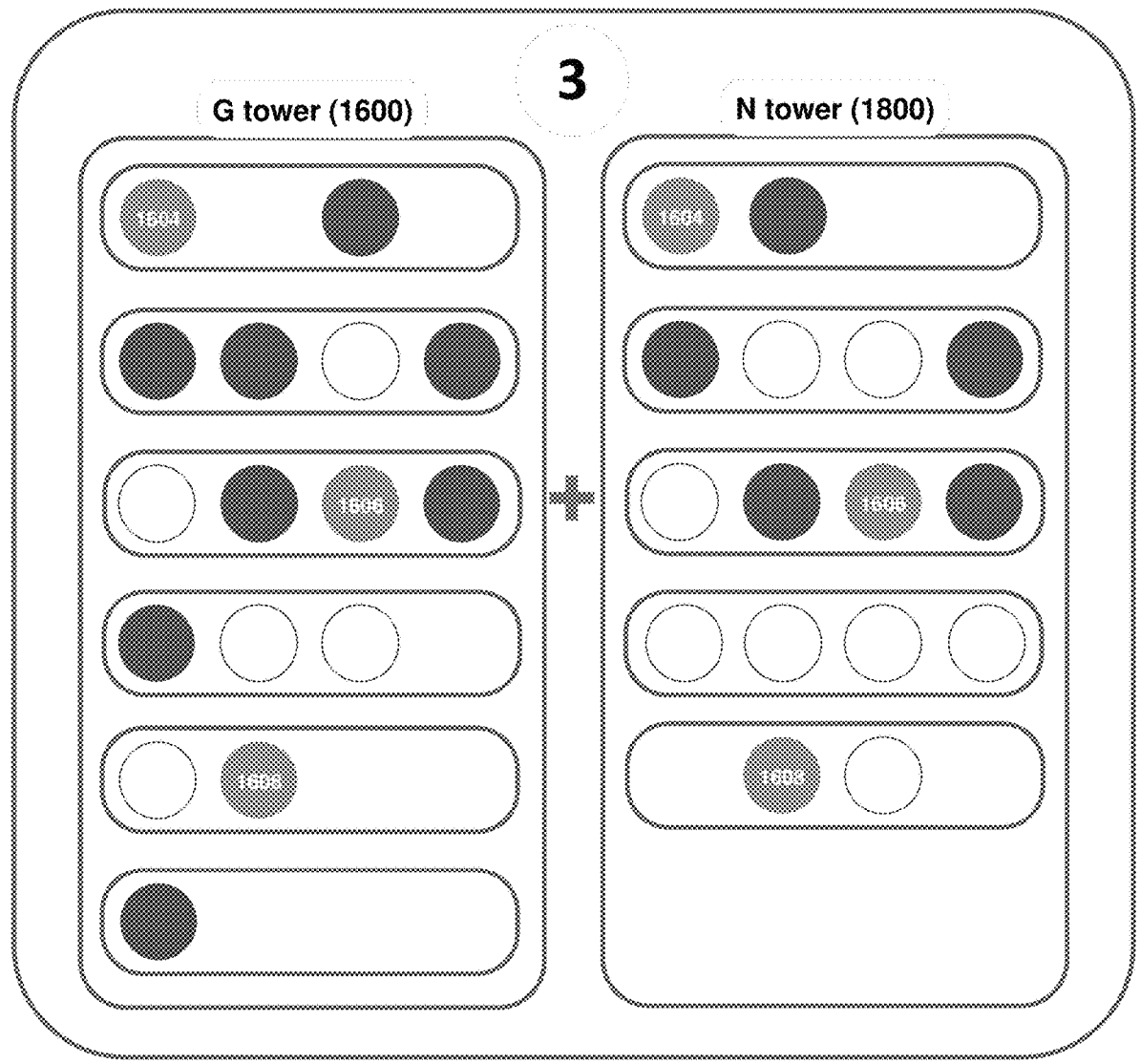
Figure 19:
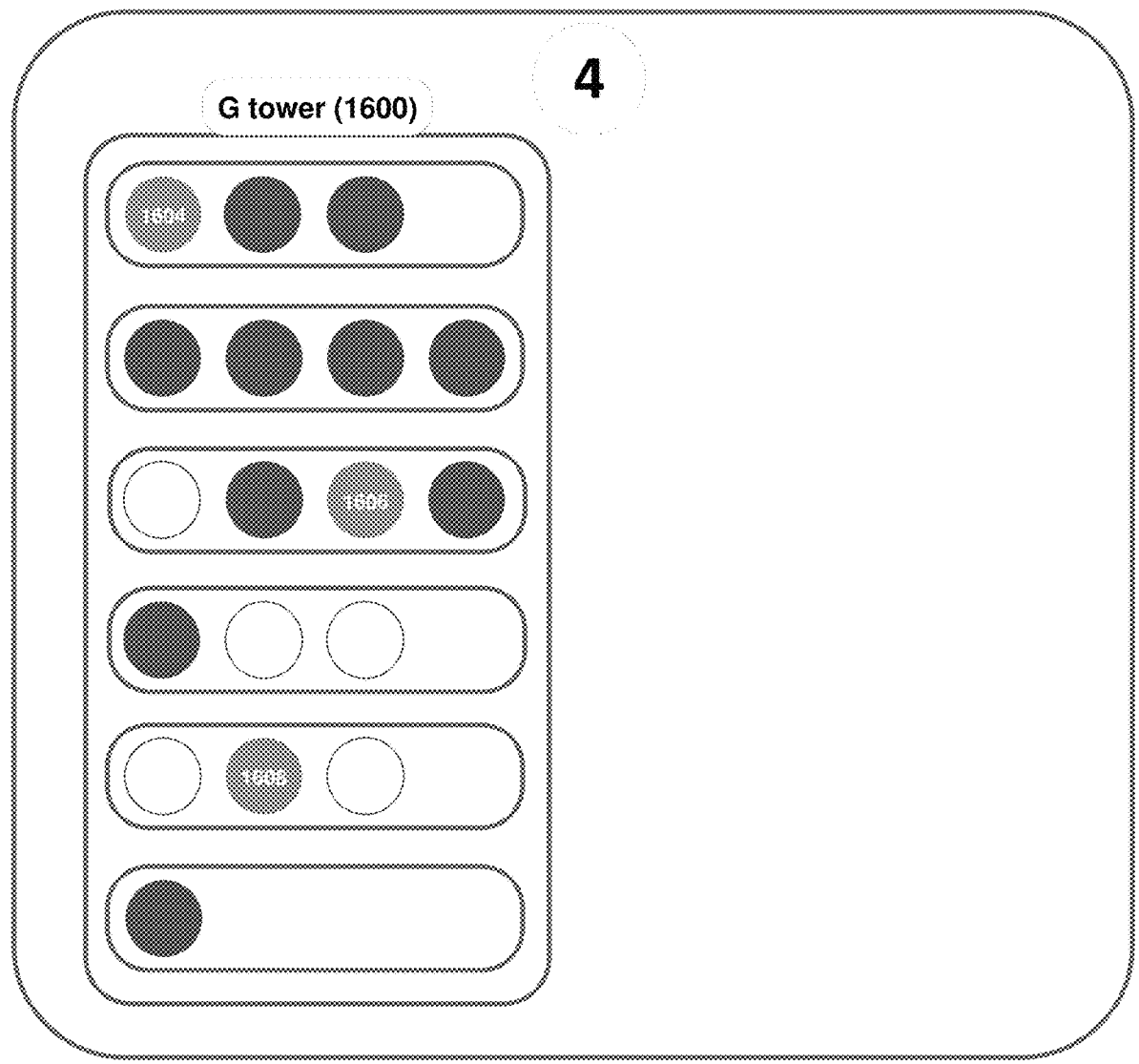

Referring to FIG. 18, lock sequence analysis process 10 may determine that there are no additional cross points and may adjust the matrix tower levels of global lock sequence matrix tower 1600 and next lock sequence matrix tower 1602 (e.g., by expanding next lock sequence matrix tower 1702 to include an additional matrix level). Referring to FIG. 19, lock sequence analysis process 10 may combine 304 global lock sequence matrix tower 1600 and next lock sequence matrix tower 1800 to generate a combined lock sequence matrix tower (e.g., the combined lock sequence matrix tower as shown in FIG. 19). While the above example includes e.g., three cross points, it will be appreciated that any number of cross points may be identified within the scope of the present disclosure. Additionally, it will be appreciated that the above process may be repeated for each lock sequence of the plurality of lock sequences received by lock sequence analysis process 10.

As discussed above, lock sequence analysis process 10 may adjust the position of cross points and tower levels to combine two towers at a time. In some implementations, lock sequence analysis process 10 may allow for a significant processing advantage compared with traditional lock sequence management techniques which insert locks one by one into a data structure and remapping each time. By contrast, lock sequence analysis process 10 may adjust the position of cross points and tower levels and combine pairs of lock sequence matrix towers in one combination operation.

In some implementations, identifying 306 the one or more lock sequence conflicts within the plurality of lock sequences may include identifying 320 a sequence for the plurality of cross points in the at least two lock sequence matrix towers that cannot be combined. For example, suppose lock sequence analysis process 10 generates a combined lock sequence matrix tower as shown in the example below:

```
LSA>*******************************************
LSA>=================== TowerLVL:0 ===================
LSA>-------------------------------------
```

```
LSA>BASE:---UFSCore_FileSystem+430
LSA>WORMHOLE:
LSA>=================== TowerLVL:1000 ===================
LSA>IX<UFSCore_FileSystem+430>:---VFSCore_FileSystem+84
LSA>----------------------------------------------
LSA>BASE:---VFSCore_FileSystem+84---UFS64_FileSystem+298
LSA>WORMHOLE:
LSA>=================== TowerLVL:2000 ===================
LSA>IX<VFSCore_FileSystem+84>:---File_NamingNode+95---File_NamingNode+94
LSA>----------------------------------------------
LSA>BASE:---File_NamingNode+95---File_NamingNode+94
LSA>WORMHOLE:---UFS64_FileSystem+298
LSA>=================== TowerLVL:3000 ===================
LSA>IX<File_NamingNode+95>:---UFSCore_Vnode+599
LSA>IX<File_NamingNode+94>:---UFSCore_Vnode+599
LSA>----------------------------------------------
LSA>BASE:---UFSCore_Vnode+599
LSA>WORMHOLE:---UFS64_FileSystem+298---File_NamingNode+94
LSA>=================== TowerLVL:4000 ===================
LSA>IX<UFSCore_Vnode+599>:---UFSCore_Vnode+581
LSA>----------------------------------------------
LSA>BASE:---UFSCore_Vnode+581---UFSCore_FileSystem+448
LSA>WORMHOLE:---UFS64_FileSystem+298---File_NamingNode+94
LSA>=================== TowerLVL:5000 ===================
LSA>IX<UFSCore_Vnode+581>:---CacheAlignedRWlockRT+24---DVLD_VOL+116
LSA>IX<UFS64_FileSystem+298>:---CacheAlignedRWlockRT+24---DVLD_VOL+116
LSA>IX<UFSCore_FileSystem+448>:---CacheAlignedRWlockRT+24---DVLD_VOL+116
LSA>IX<File_NamingNode+94>:---DVLD_VOL+116
LSA>----------------------------------------------
LSA>BASE:---CacheAlignedRWlockRT+24---DVLD_VOL+116
LSA>WORMHOLE:
LSA>=================== LSA CORE SUMMARY ===================
LSA>TOTAL NOTES NUMBER: 10
LSA>TOTAL LEARNING TIMES: 137
LSA>TOTAL LOCK PAIRS: 18549
LSA:REPORT
G:File_NamingNode+94->UFSCore_Vnode+599<*>N:UFSCore_Vnode+599->
File_NamingNode+94 GCTXID: 1588 -> 1483 NCTXID: 1363 -> 1388
LSA:REPORT
G:File_NamingNode+94->UFSCore_Vnode+599<*>N:UFSCore_Vnode+599->
File_NamingNode+94 GCTXID: 1588 -> 1483 NCTXID: 2259 -> 2284
```

Figure 20:
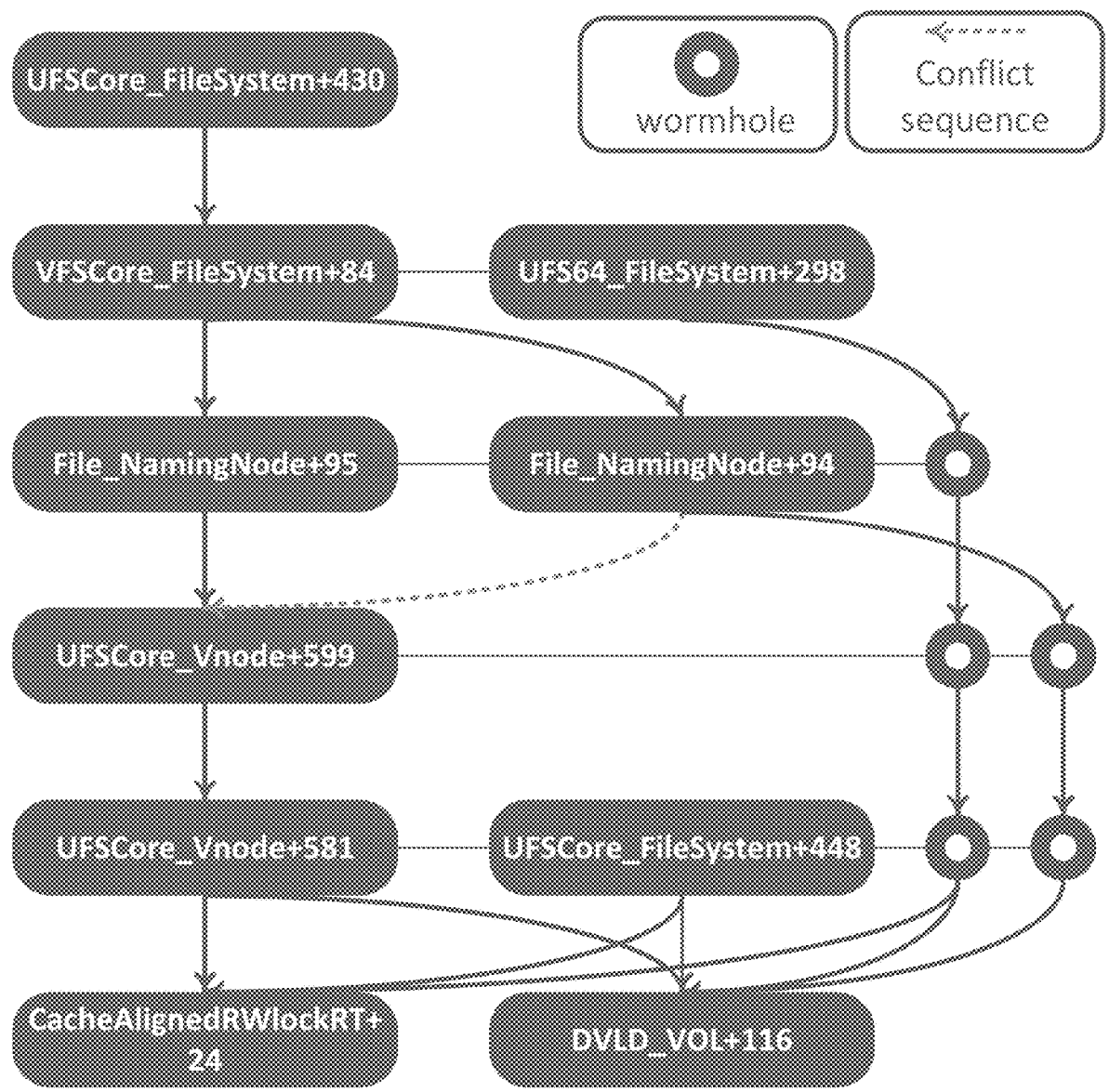
FIG. 20 is an example diagrammatic view of one or more lock sequence conflicts identified by one or more example implementations of the disclosure.

In this example and as shown in FIG. 20, lock sequence analysis process 10 may identify 306 one or more lock sequence conflicts by identifying 320 a sequence for the plurality of cross points in the at least two lock sequence matrix towers that cannot be combined. Specifically, lock sequence analysis process 10 may identify 320 the cross points "File_NamingNode+94" and "N:UFSCore_Vnode+ 599" that cannot be combined. Accordingly, lock sequence analysis process 10 may generate a report and/or alert (e.g., pop-up window, a report displayed on a user interface, etc.) with the one or more lock sequence conflicts. In some implementations, lock sequence analysis process 10 may indicate which lock address(es) have a lock sequence conflict along with a related lock symbol address. In some implementations, lock sequence analysis process 10 may provide a lock caller back trace for reference (e.g., to assist a user or process addressing the lock sequence conflict).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

creating, using the computing device, a plurality of objects and generating a lock information binary file that includes information for each lock operation associated with the plurality of objects of the computing device;

receiving, using the computing device, a plurality of lock sequences associated with a plurality of objects of the computing device by processing the lock information binary file associated with processing the plurality of objects of the computing device at runtime;

generating, using the computing device, a matrix representative of at least a portion of a lock sequence of the plurality of lock sequences with a reference to a next matrix and an indication of a matrix tower level, wherein the matrix includes one or more rows associated with a matrix index and one or more columns associated with a lock record;

generating, using the computing device, a plurality of matrices for each lock sequence of the plurality of lock sequences to generate a lock sequence matrix tower for each lock sequence of the plurality of lock sequences for each object of the plurality of objects of the computing device;

combining, using the computing device, a plurality of lock sequence matrix towers by utilizing levels of each lock sequence matrix tower, thus defining a combined lock sequence matrix tower; and identifying, using the computing device, one or more lock sequence conflicts within the plurality of lock sequences based upon, at least in part, the combined lock sequence matrix tower.

2. The computer-implemented method of claim 1, wherein the matrix tower level indicates a tower level of a particular matrix in the lock sequence matrix tower.

3. The computer-implemented method of claim 1, wherein generating the plurality of matrices for each lock sequence of the plurality of lock sequences includes generating the lock sequence matrix tower for each lock sequence based upon, at least in part, a level of one or more locks and one or more ancestor locks associated with the one or more locks.

4. The computer-implemented method of claim 1, wherein combining the plurality of lock sequence matrix towers includes identifying a plurality of cross points in at least two lock sequence matrix towers of the plurality of lock sequence matrix towers.

5. The computer-implemented method of claim 4, wherein combining the plurality of lock sequence matrix towers includes:
   determining a sequence for the plurality of cross points in the at least two lock sequence matrix towers; and
   in response to determining that the sequences for the plurality of cross points in the at least two lock sequence matrix towers are different, moving one or more locks of the plurality of cross points to a different matrix level within the combined lock sequence matrix tower.

6. The computer-implemented method of claim 5, wherein identifying the one or more lock sequence conflicts within the plurality of lock sequences for the plurality of objects includes identifying a sequence for the plurality of cross points in the at least two lock sequence matrix towers that cannot be combined.

7. A computer program product residing on a non-transitory computer readable medium having a plurality of instructions stored thereon which, when executed by a processor, cause the processor to perform operations comprising:
   creating a plurality of objects and generating a lock information binary file that includes information for each lock operation associated with the plurality of objects of the computing device;
   receiving a plurality of lock sequences associated with a plurality of objects of the computing device by processing the lock information binary file associated with processing the plurality of objects of the computing device at runtime;
   generating a matrix representative of at least a portion of a lock sequence of the plurality of lock sequences with a reference to a next matrix and an indication of a matrix tower level, wherein the matrix includes one or more rows associated with a matrix index and one or more columns associated with a lock record;
   generating a plurality of matrices for each lock sequence of the plurality of lock sequences to generate a lock sequence matrix tower for each lock sequence of the plurality of lock sequences for each object of the plurality of objects of the computing device;
   combining a plurality of lock sequence matrix towers by utilizing levels of each lock sequence matrix tower, thus defining a combined lock sequence matrix tower; and
   identifying one or more lock sequence conflicts within the plurality of lock sequences based upon, at least in part, the combined lock sequence matrix tower.

8. The computer program product of claim 7, wherein the matrix tower level indicates a tower level of a particular matrix in the lock sequence matrix tower.

9. The computer program product of claim 7, generating the plurality of matrices for each lock sequence of the plurality of lock sequences includes generating the lock sequence matrix tower for each lock sequence based upon, at least in part, a level of one or more locks and one or more ancestor locks associated with the one or more locks.

10. The computer program product of claim 7, wherein combining the plurality of lock sequence matrix towers includes identifying a plurality of cross points in at least two lock sequence matrix towers of the plurality of lock sequence matrix towers.

11. The computer program product of claim 10, wherein combining the plurality of lock sequence matrix towers includes:
    determining a sequence for the plurality of cross points in the at least two lock sequence matrix towers; and
    in response to determining that the sequences for the plurality of cross points in the at least two lock sequence matrix towers are different, moving one or more locks of the plurality of cross points to a different matrix level within the combined lock sequence matrix tower.

12. The computer program product of claim 11, wherein identifying the one or more lock sequence conflicts within the plurality of lock sequences for the plurality of objects includes identifying a sequence for the plurality of cross points in the at least two lock sequence matrix towers that cannot be combined.

13. A computing system comprising:
    a memory; and
    a processor configured to create a plurality of objects and generate a lock information binary file that includes information for each lock operation associated with the plurality of objects of the computing device, wherein the processor is further configured to receive a plurality of lock sequences associated with a plurality of objects of the computing device by processing the lock information binary file associated with processing the plurality of objects of the computing device at runtime, wherein the processor is further configured to generate a matrix representative of at least a portion of a lock sequence of the plurality of lock sequences with a reference to a next matrix and an indication of a matrix tower level, wherein the matrix includes one or more rows associated with a matrix index and one or more columns associated with a lock record, wherein the processor is further configured to generate a plurality of matrices for each lock sequence of the plurality of lock sequences to generate a lock sequence matrix tower for each lock sequence of the plurality of lock sequences for each object of the plurality of objects of the computing device, wherein the processor is further configured to combine a plurality of lock sequence matrix towers by utilizing levels of each lock sequence matrix tower, thus defining a combined lock sequence matrix tower, and wherein the processor is further configured to identify one or more lock sequence conflicts within the plurality of lock sequences based upon, at least in part, the combined lock sequence matrix tower.

14. The computing system of claim 13, the matrix tower level indicates a tower level of a particular matrix in the lock sequence matrix tower.

15. The computing system of claim 13, generating the plurality of matrices for each lock sequence of the plurality of lock sequences includes generating the lock sequence matrix tower for each lock sequence based upon, at least in part, a level of one or more locks and one or more ancestor locks associated with the one or more locks.

16. The computing system of claim 13, wherein combining the plurality of lock sequence matrix towers includes identifying a plurality of cross points in at least two lock sequence matrix towers of the plurality of lock sequence matrix towers.

17. The computing system of claim 16, wherein combining the plurality of lock sequence matrix towers includes:
   determining a sequence for the plurality of cross points in the at least two lock sequence matrix towers; and
   in response to determining that the sequences for the plurality of cross points in the at least two lock sequence matrix towers are different, moving one or more locks of the plurality of cross points to a different matrix level within the combined lock sequence matrix tower.

\* \* \* \* \*